United States Patent [19]
Kojori

[11] Patent Number: 5,991,327
[45] Date of Patent: Nov. 23, 1999

[54] SMART PREDICTIVE LINE CONTROLLER FOR AC AND DC ELECTRIC ARC FURNACES

[75] Inventor: Hassan Ali Kojori, Etobicoke, Canada

[73] Assignee: Inverpower Controls Ltd., Burlington, Canada

[21] Appl. No.: 08/548,683

[22] Filed: Oct. 26, 1995

[51] Int. Cl.[6] ................................................. H05B 7/148
[52] U.S. Cl. ........................... 373/104; 373/47; 373/108; 323/109; 364/483
[58] Field of Search .................................. 373/47, 49, 70, 373/102, 104, 108; 323/102, 109, 124, 9, 210, 211, 119; 364/483, 487

[56] References Cited

U.S. PATENT DOCUMENTS

| | | | |
|---|---|---|---|
| 3,936,727 | 2/1976 | Kelley, Jr. et al. | 323/102 |
| 3,989,999 | 11/1976 | Thompson et al. | 323/9 |
| 4,698,581 | 10/1987 | Shimamura et al. | 323/211 |
| 5,155,740 | 10/1992 | Ao et al. | 373/108 |
| 5,239,554 | 8/1993 | Gensini et al. | 373/102 |
| 5,315,527 | 5/1994 | Beckwith | 364/483 |
| 5,438,588 | 8/1995 | Wanner | 373/108 |
| 5,463,653 | 10/1995 | Du Parc et al. | 373/108 |
| 5,583,883 | 12/1996 | Paulsson et al. | 373/102 |

OTHER PUBLICATIONS

W. Staib et al, Neural Network Conversion of the Electric Arc Furnace into the Intelligent Arc Furnace, 1991, pp. 749–756.

CEA R&D Report Summary, Project 042 T 818, Static VAR Compensation of Voltage Flicker from Electric Arc Furnaces, Oct. 1993.

IEEE Transactions on Power Apparatus and Systems, vol. PAS–97, No. 5, Sep./Oct. 1978, pp. 1935–1945, Principles and Applications of Static . . . .

*Primary Examiner*—Tu Ba Hoang

[57] ABSTRACT

In an electric arc furnace having a power source for applying at least one AC/DC voltage to at least one electrode, and the electrode being spaced apart from a grounded container for receiving scrap metal, wherein the application of the at least one AC/DC voltage to the at least one electrode causes generation of an arc between the electrode and the container for melting the scrap metal, a predictive line controller comprising a plurality of AC switches intermediate the power source and the electrode, and a central controller for monitoring the at least one AC/DC voltage and generating a signal model thereof, and in response generating and applying a plurality of gating signals to the plurality of AC switches, the gating signals being delayed by respective predetermined amounts based on the model, for causing the plurality of AC switches to gate the at least one AC/DC voltage in accordance with the model so as to minimize flicker in the electric arc furnace.

23 Claims, 43 Drawing Sheets

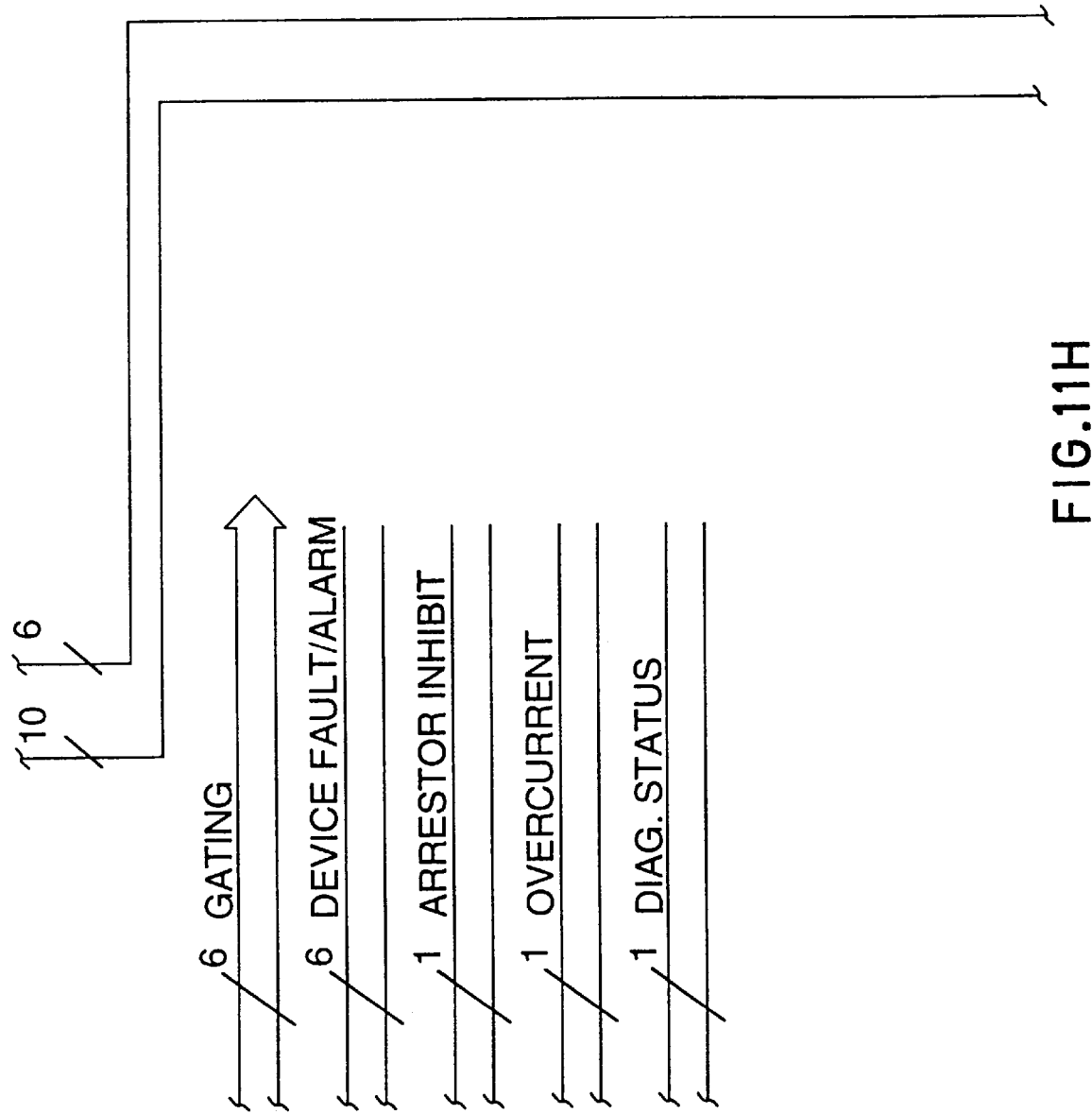

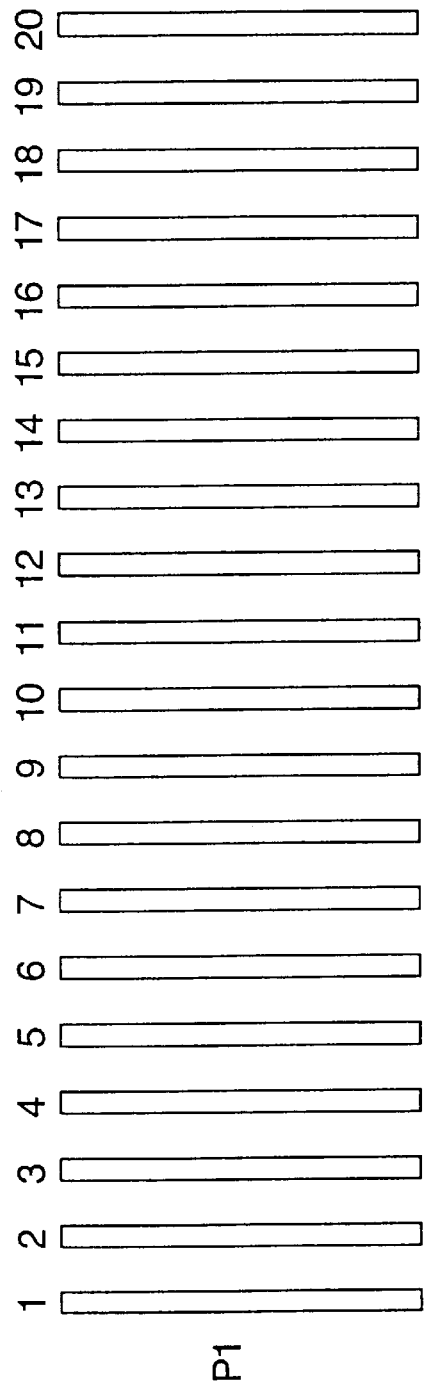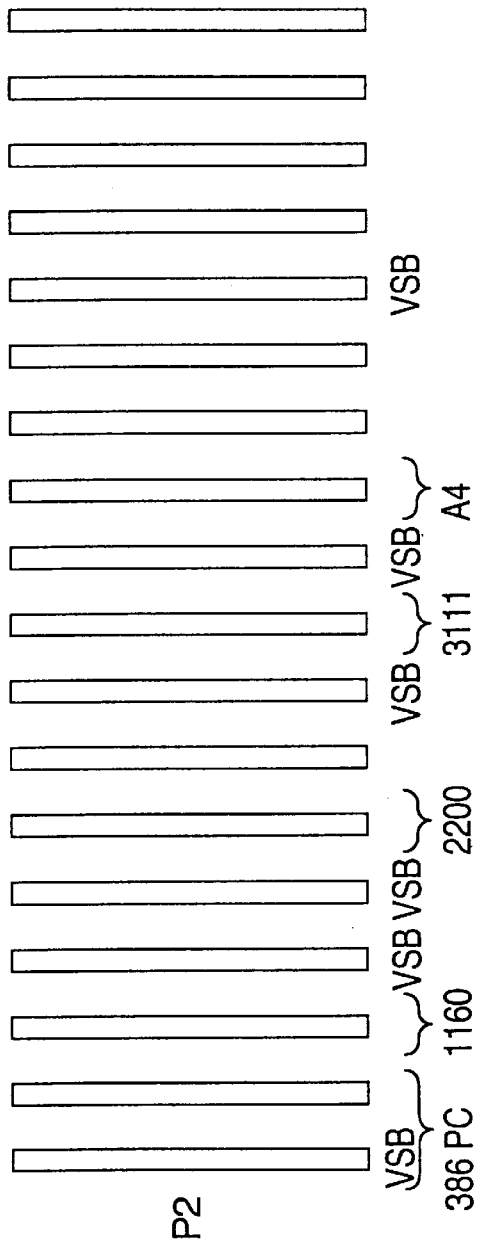
FIG.13

| FIELD SIDE | | CCC | CENTRAL CONTROLLER |
|---|---|---|---|
| 101C-1 | DISCONNECT SWITCH DS1 STATUS | 1 / 2 | M/W PROTECTION BOARD |
| 101C-2 | DISCONNECT SWITCH DS2 STATUS | 3 / 4 | M/W PROTECTION BOARD |
| 101C-3 | DISCONNECT SWITCH DS3 STATUS | 5 / 6 | M/W PROTECTION BOARD |
| 101C-4 | DISCONNECT SWITCH DS4 STATUS | 7 / 8 | M/W PROTECTION BOARD |
| 101C-5 | DISCONNECT SWITCH DS5 STATUS | 9 / 10 | M/W PROTECTION BOARD |
| 101C-6 | DISCONNECT SWITCH DS6 STATUS | 11 / 12 | M/W PROTECTION BOARD |
| 101C-7 | DISCONNECT SWITCH DS7 STATUS | 13 / 14 | M/W PROTECTION BOARD |
| 102C | CIRCUIT BREAKER 120VAC NEUTRAL | 15 / 16 | M/W PROTECTION BOARD |
| 103C | LASCO OKAY(GO) | 17 / 18 | M/W PROTECTION BOARD |
| 104C | COOLING SYSTEM ALARM | 19 / 20 | M/W PROTECTION BOARD |
| 105C | COOLING SYSTEM FAULT | 21 / 22 | M/W PROTECTION BOARD |
| 106C | ACLC SYSTEM ALARM | 23 / 24 | M/W PROTECTION BOARD |
| 107C | ACLC SYSTEM FAULT | 25 / 26 | M/W PROTECTION BOARD |
| 108C | COOLING SYSTEM START/STOP | 27 / 28 | M/W PROTECTION BOARD |
| 109C | STATUS OF DAMPER CIRCUITS | 29 / 30 | M/W PROTECTION BOARD |
| 110C | GE-LIM CT-STATUS | 31 / 32 | M/W PROTECTION BOARD |
| 111C | DIAGNOSTICS ENABLE | 33 / 34 | VME - DIGITAL O/P BOARD |
| 112C | SPARE | 35 / 36 | |
| 113C | SPARE | 37 / 38 | |
| 114C | SPARE | 39 / 40 | |
| 115C | SPARE | 41 / 42 | |
| 116C | SPARE | 43 / 44 | |
| 117C | SPARE | 45 / 46 | |
| 118C / 107002 | SPARE | 47 / 48 | |

120AC NEUTRAL
REF. JME 9001 111

FIG.16

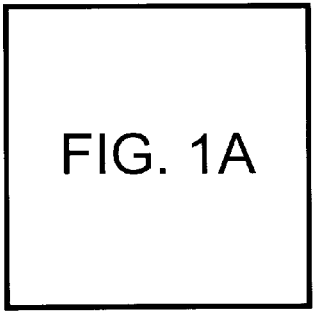 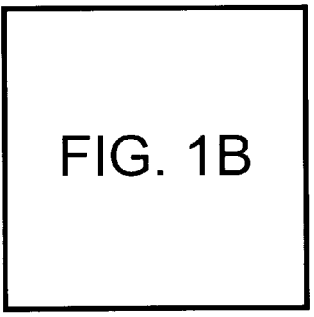 
FIG. 17
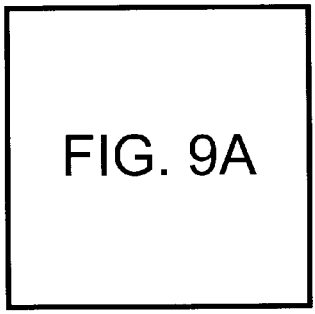 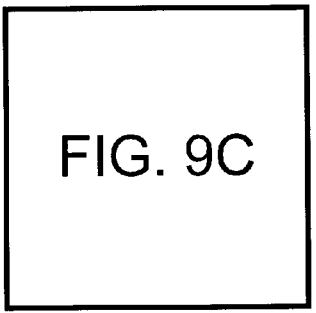
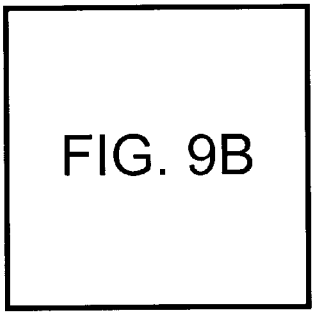 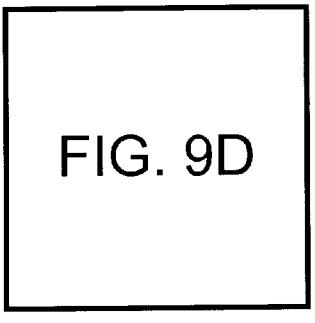
FIG. 18

| FIG. 11A | FIG. 11C | FIG. 11G |
| FIG. 11B | FIG. 11D | FIG. 11H |
|  | FIG. 11E | FIG. 11I |
|  | FIG. 11F | FIG. 11J |

FIG. 19

| FIG. 12A | FIG. 12B | FIG. 12D |
|---|---|---|
|  | FIG. 12C | FIG. 12E |

FIG. 20

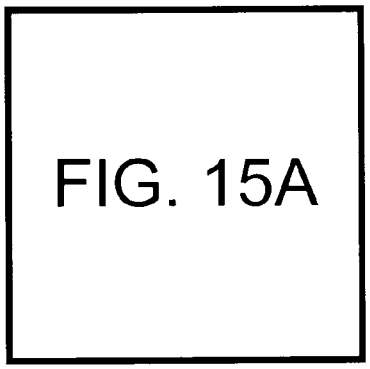
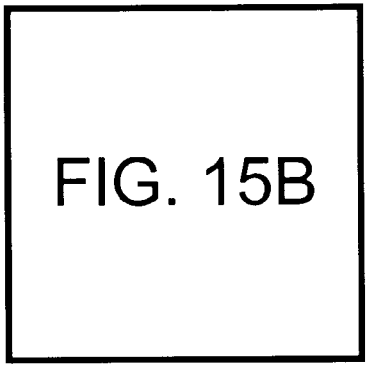
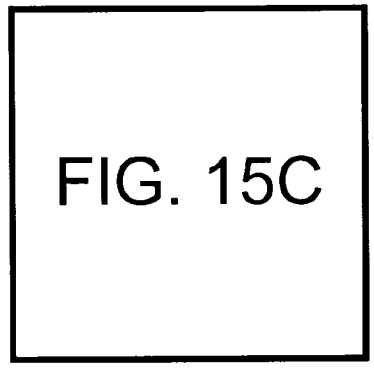
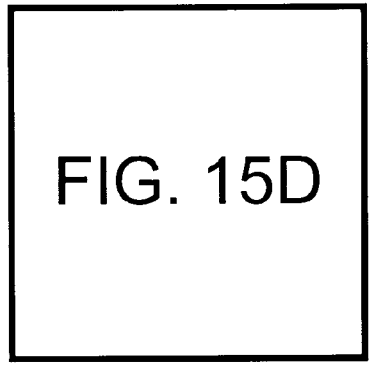
FIG. 21

SMART PREDICTIVE LINE CONTROLLER FOR AC AND DC ELECTRIC ARC FURNACES

FIELD OF THE INVENTION

This invention relates in general to electric arc furnaces, and more particularly to a method and apparatus for reducing flicker in a DC or AC scrap metal arc furnace.

BACKGROUND OF THE INVENTION

Electric arc furnaces are well known for melting scrap metal for recycling purposes. An arc furnace is an exothermic apparatus the heat energy for which is generated by the flow of electrical current through one or more arcs internal to the furnace.

One common problem associated with electric arc furnaces, is the problem of "flicker" (i.e. voltage disturbances in a supply network arising from large and rapid fluctuations in load current during certain stages of the furnace and at frequencies up to 25 Hz). The severity of flicker may be rated as a function of the difference between short circuit KVA to operating KVA.

Software voltage control has been used in the past to reduce flicker in DC and AC systems (see L. Gyugyi and R. H. Otto, "Static Shunt Compensation for Voltage Flicker Reduction and Power Factor Correction", Proceedings of the American Power Conference, Vol. 38, pp. 1271–1286, 1976, and W. E. Staib, N. G. Bliss and R. B. Staib, "Neural Network Conversion of the Electric Arc Furnace", Steel Making Conference Proceedings, pp. 749–756, 1991).

Shunt type compensators (static VAR compensators) have been proposed for flicker reduction (see J. M. Wikston, "Static VAR Compensation of Voltage Flicker From Arc Furnaces", CEA Report No. 0427818m 1993), which describes the difficulties of such systems in eliminating flicker.

None of these prior art systems provides series type A.C. current control or predictive control on direct current.

SUMMARY OF THE INVENTION

According to the present invention, a series-type flicker controller is provided which is based on a predictive control algorithm to prevent excessive line current excursions. According to the preferred embodiment, a plurality of thyristors are used to control the high voltage (HV) feed to an AC electric arc furnace. A pair of parallel connected opposite polarity thyristors is used for each of the three AC phases. Sophisticated software control is used to predict the firing angle for each of the thyristors in order to achieve flicker reduction.

In general, according to the present invention there is provided an improvement in electric arc furnaces having a power source for applying at least one AC/DC voltage to at least one electrode which is spaced apart from a grounded container for receiving scrap metal, wherein the application of the at least one AC/DC voltage to the at least one electrode causes generation of an arc between the electrode and the container for melting the scrap metal. The improvement includes a predictive line controller comprising:

a) a plurality of AC switches intermediate the power source and the at least one electrode; and b) a central controller for monitoring the at least one AC/DC voltage and generating a system model thereof, and in response generating and applying a plurality of gating signals to the plurality of AC switches, the gating signals being delayed by respective predetermined amounts based on the aforementioned model, for causing the plurality of AC switches to gate the at least one AC/DC voltage in accordance with the model so as to minimize flicker in the electric arc furnace.

BRIEF DESCRIPTION OF THE DRAWINGS

A detailed description of the preferred embodiment is provided herein below with reference to the following drawings, in which:

FIG. 13 is a VME back-plane schematic diagram according to the preferred embodiment;

FIG. 16 shows the central control signal terminal block for the line controller according to the preferred embodiment.

FIG. 17 is a block diagram showing the relationship between FIGS. 1A, 1B and 1C;

FIG. 18 is a block diagram showing the relationship between FIGS. 9A, 9B, 9C and 9D;

FIG. 19 is a block diagram showing the relationship between FIGS. 11A, 11B, 11C, 11D, 11E, 11F, 11G, 11H and 11I;

FIG. 20 is a block diagram showing the relationship between FIGS. 12A, 12B, 12C, 12D and 12E;

FIG. 21 is a block diagram showing the relationship between FIGS. 15A, 15B, 15C and 15D.

DETAILED DESCRIPTION OF THE PREFERRED EMBODIMENT

Figure 1A:
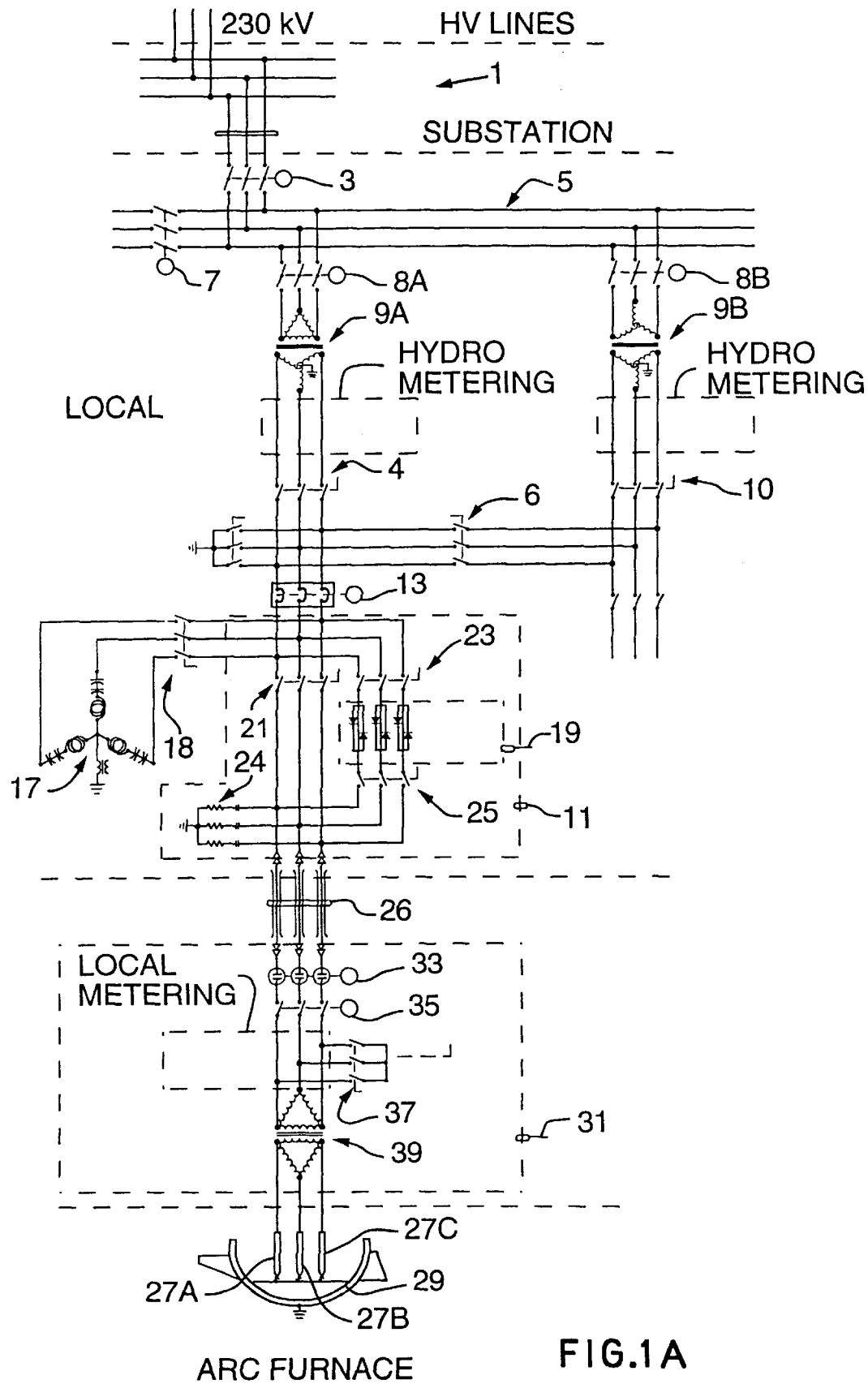
FIG. 1, comprising parts 1A–1C, is a schematic representation of an electric arc furnace modified to include a predictive line controller in accordance with the present invention.
FIG. 1B is a schematic representation of the predictive line controller forming part of the electric arc furnace of FIG. 1A.
Figure 1B:
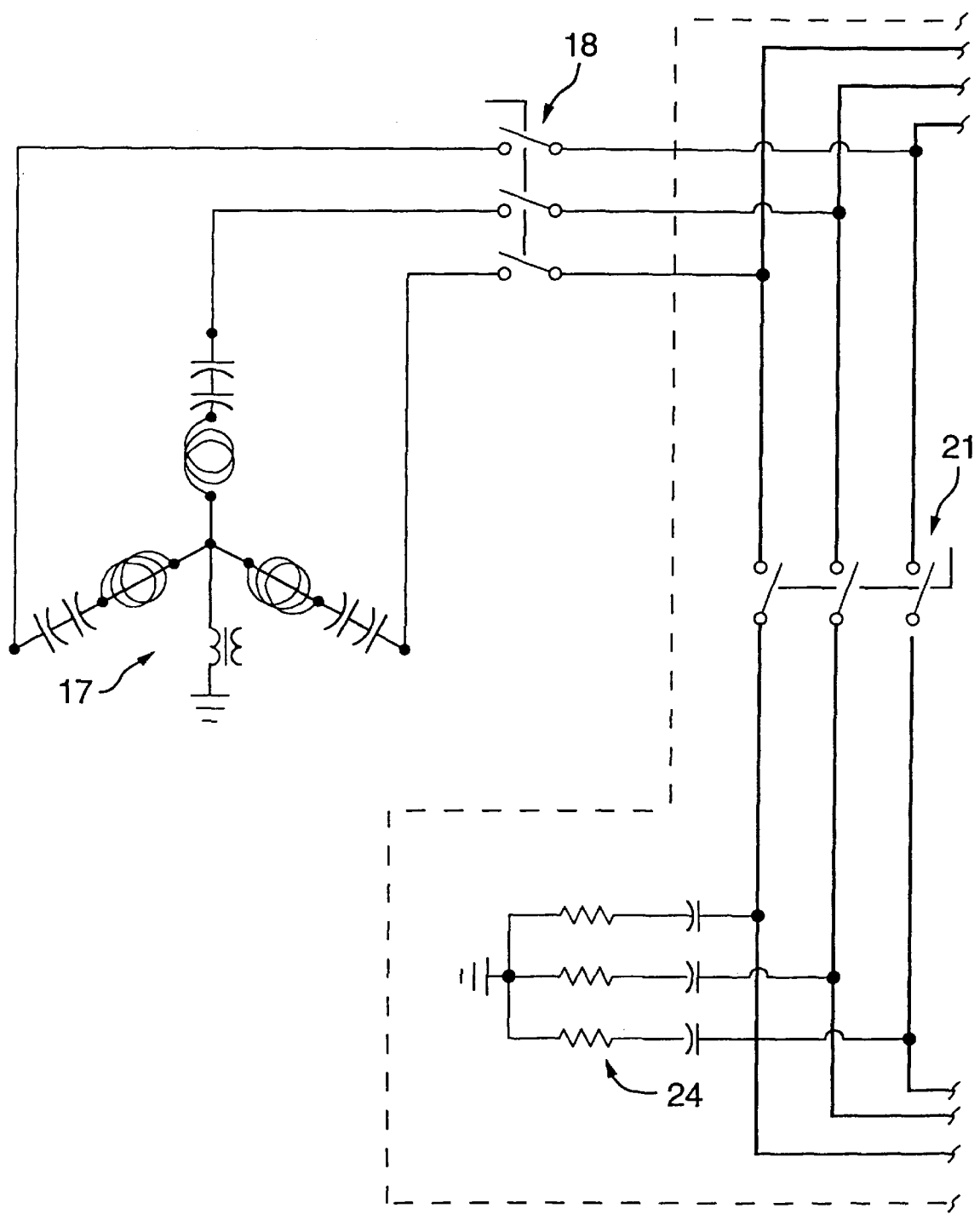

Turning to FIGS. 1A and 1B, a 90 MVA low reactance (LR) electric arc furnace is shown. Three phase electrical power is received from high voltage transmission lines 1 at 230 kV and is applied via transmission towers 2 and a motorized three phase disconnect switch 3 to an internal plant power transmission bus 5. The power bus 5 may contain one or more additional three phase disconnect switches 7, 8A, 8B, etc., in the usual manner. Power is drawn from the local bus 5 and stepped-down via power transformer 9A for application to the predictive AC line controller 11 of the present invention, discussed in greater detail below. A second power transformer 9B is provided for redundancy. Hydro metering may be provided where required. Disconnect switches 4, 6, and 10 are used to control which of the transformers 9A and 9B is to supply power to the furnace. A circuit breaker 13 may also be provided in a well known manner.

According to the present invention, three supplemental reactors 15A, 15B, and 15C (FIG. 1C) are provided, one for each phase of the three phase power, for limiting the fault current and thereby protecting the AC switches 19 (discussed below), in the event of a short circuit being connected to the switches. Usually, a three phase capacitor bank 17 (typically rated at 35 MVAR) is provided for power factor correction. The capacitor bank 17 may be switched by means of manual disconnect switch 18 under no-load.

As discussed in greater detail below, a plurality of thyristor switches 19 (FIG. 1C) (configured in pairs Q1, Q4 and Q3, Q6 and Q2, Q5) are provided for controlling arc voltage and current so as to reduce the DC component and thereby reduce flicker. The AC switches 19 may be connected in-line or disconnected via manual switches 21, 23, and 25 (i.e. for a no-load condition).

A high voltage switch damper 24 is provided for damping high frequency components of the 46 kV AC system voltage at the output of the AC switches 19. This damper is required to prevent overheating of the underground cable 26.

Three phase power is applied to furnace electrodes 27A, 27B and 27C for melting scrap metal 29. The power is applied to the electrodes 27A, 27B and 27C via transformer vault 31. Transformer vault 31 includes (1) vacuum switch 33 for energization of the furnace transformer 39, (2) motorized disconnect switch 35 for providing a visual break in the AC/DC voltage feeders to the furnace transformer, (3) ground switch 37 for providing a ground on the incoming voltage feeders which are used during maintenance when the vacuum switch 33 and disconnect switch 25 are in the open position, and (4) the furnace transformer 39 for providing voltage transformation from 46 kV to 780V. Local metering may also be provided where required.

Figure 1C:
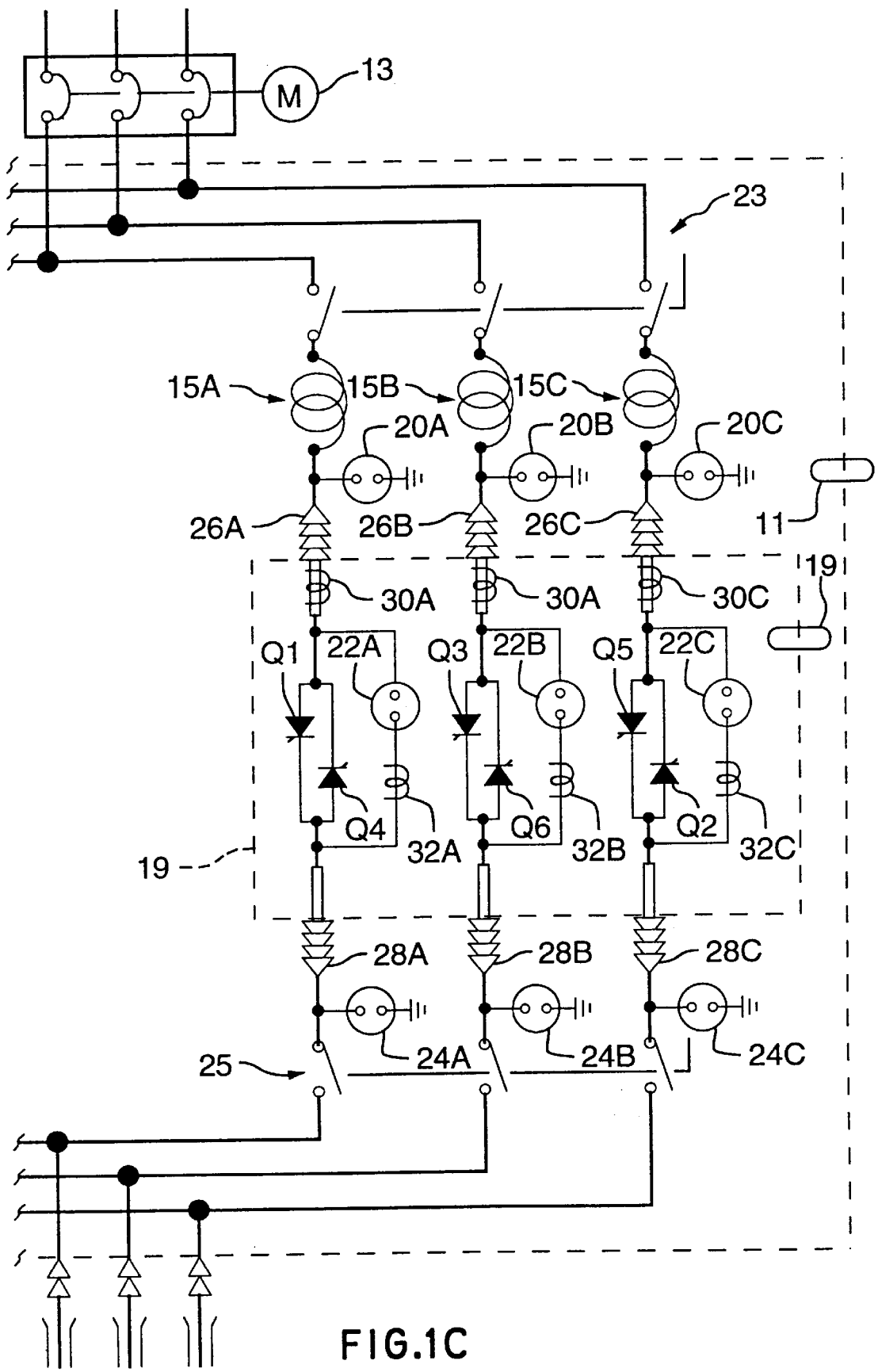

In addition, current transformers (CTs) 20A, 20B, 20C; 22A, 22B, 22C; 24A, 24B, 24C; 30A, 30B, 30C; 32A, 32B and 32C; and roof bushings 26A, 26B, 26C, and 28A, 28B, 28C, are provided for protection as shown in FIG. 1C.

The line CTs 20A, 20B and 20C monitor the line currents and are used to detect excessive peak currents through the AC switches 19. The arrestor CTs 22A, 22B and 22C monitor any arrestor conduction in excess of a predetermined threshold, due to an overvoltage across the AC switches 19.

Figure 2:
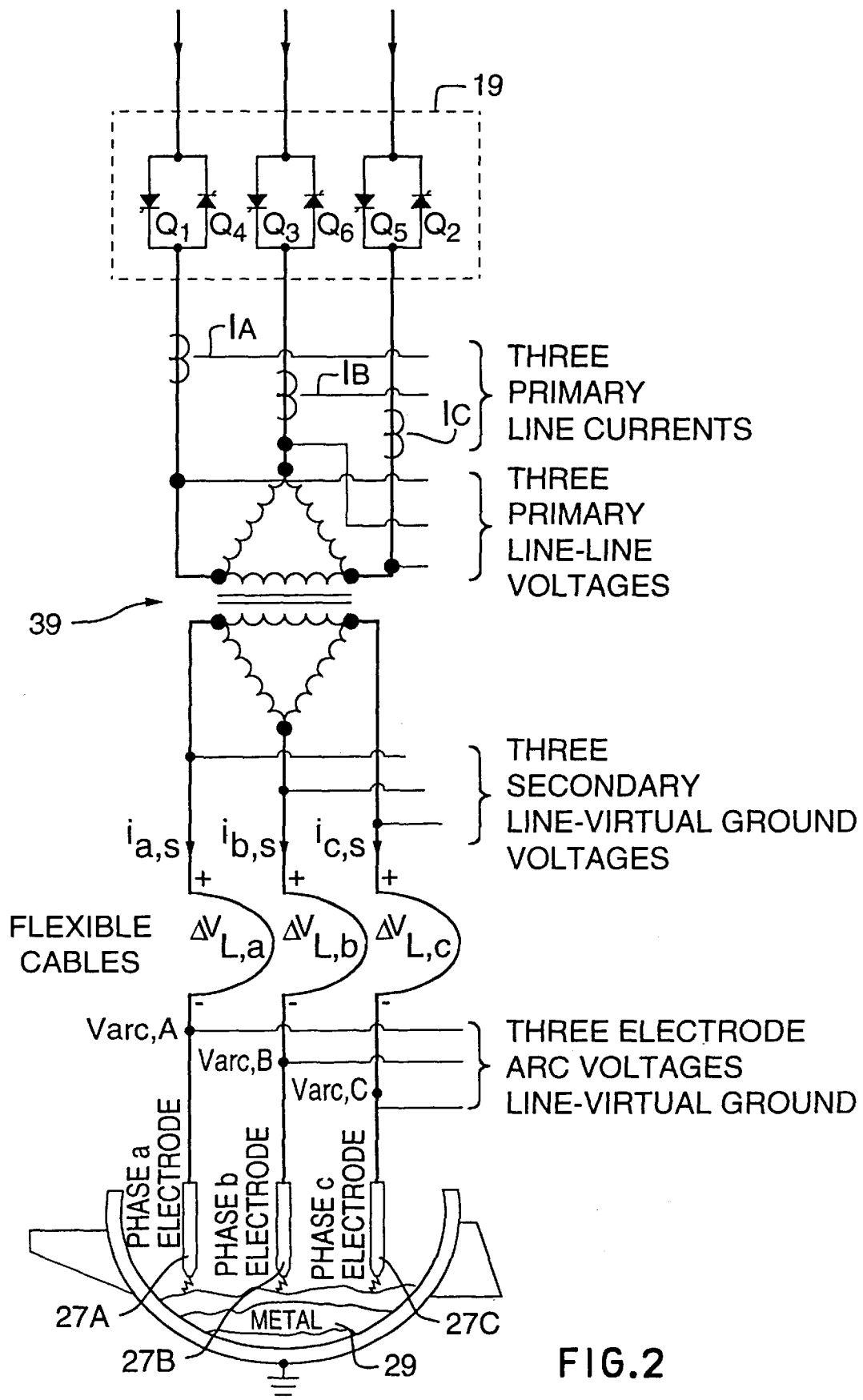
FIG. 2 is a block diagram showing analog signal conditioning of the primary and secondary sides of the furnace transformer shown in FIG. 1.

Turning now to FIG. 2, the six thyristors Q1–Q6 are shown connected as three pairs of opposite polarity switches. In actual practice, a stack of forty-four air cooled thyristors may be provided in series for each AC phase, to provide high voltage rating. Gating signals for the thyristors Q1–Q6 are generated by the control circuit, as discussed in greater detail below with reference to FIGS. 3 and 11.

Figure 3:
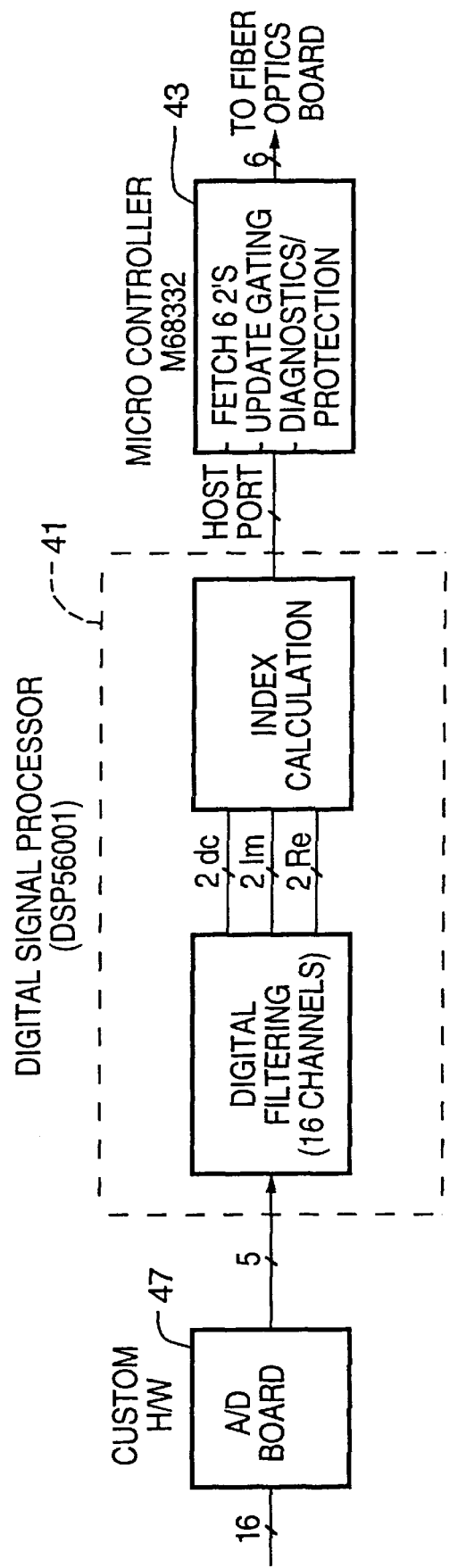
FIG. 3 is a block diagram of a digital signal processing unit and microcontroller of the line controller according to the preferred embodiment.

Turning to FIG. 3, the controller is shown in greater detail comprising a digital signal processor DSP 41 (such as a DSP56001) functioning as a co-processor for a microcontroller 43 (such as a MC68332). Up to 16 analog input signals (corresponding to channels 0–15, starting from a count of zero), are received via an analog-to-digital (A/D) converter 47 for simultaneously sampling and holding up to 16 analog inputs, performing A/D conversion sequentially on the input signals and establishing communication with the DSP 41.

Returning briefly to FIG. 2, twelve analog input signals (channels 0 to 11) are received from the arc furnace instrumentation, as shown in FIG. 2 and as discussed in greater detail below with reference to FIG. 12, and are applied to A/D converter 47. Channels 12 and 13 are used for flicker voltage ($V_{FLK}$) and minimum alpha ($\alpha$) limit control voltage (Vc) as discussed in greater detail below with reference to FIG. 12. The control voltage Vc provides control of the AC system voltage by controlling the AC switches 19 as a tap changer. Two channels are not used (channels 14 and 15) and are reserved as spares. The twelve analog signals received from the arc furnace include three electrode voltages $V_{arc,A}$, $V_{arc,B}$, and $V_{arc,C}$ measured from line to virtual ground; three line (primary) currents ($I_A$, $I_B$ and $I_C$); three primary line-line AC system voltages $V_{AB,prim}$, $V_{BC,prim}$ and $V_{CA,prim}$, and three secondary AC system voltages $V_{A,sec}$, $V_{B,sec}$ and $V_{C,sec}$ measured line-virtual ground as shown in FIG. 2.

In addition to these twelve analog signals, two sets of three secondary AC system voltages (derived from transformers 9A and 9B shown in FIG. 1A) and one line-line voltage at the primary of the transformers 9A and 9B, are provided for diagnostic/protection and for synchronization of the central controller, respectively.

For each analog signal, a 16 bit word is transferred by A/D converter 47 to DSP 41 using synchronous serial interface (SSI) mode of the DSP56001. According to the successful prototype, A/D converter 47 is a 14 bit converter, so that bits 14 and 15 of the 16 bit word are zero filled. For bidirectional analog signals (i.e. ±3 volt→6 volt, full scale), each bit represents a voltage of 1 LSB=6/16,384=36.62109 mV.

On-line Fourier analysis is performed by DSP 41 on the signals received from the electric arc furnace. The fundamental and DC components for each signal input are calculated and used to predict the arc furnace system model and to control the generation of gating signals for the thyristors Q1–Q6. From this information, the power factor and active and reactive power input to the furnace are also calculated. The arc furnace parameters are used to access the delay angles ($\alpha 1$–$\alpha 6$) required for regulating the line currents. These delay angles are precalculated and stored in a look-up table accessible to the microcontroller 43, as discussed in greater detail below. The delay angles are used by the microcontroller 43 to generate a real time gating pattern for the thyristors Q1–Q6.

Limit conditions and diagnostics are then performed to provide any necessary over-ride of the delay angles ($\alpha 1$–$\alpha 6$).

A fibre optic gating interface board 902 (discussed in greater detail below with reference to FIG. 9) is used to transfer the thyristor gating signals from the microcontroller 43 to the thyristors Q1–Q6 in the furnace AC switching room, which can be approximately 1200 feet apart.

The look-up table stored in microcontroller 43 comprises six dimensions. Each variable constitutes a dimension. These variables are two of each DC, real and imaginary parts of the line-line electrode voltages. Running Discrete Fourier Series (RDFS) is applied to each of the two line-line electrode voltages $V_{arc,AB}$ and $V_{arc,BC}$ (derived from the three electrode voltages $V_{arc,A}$, $V_{arc,B}$ and $V_{arc,C}$, measured line to virtual ground). The RDFS results in one DC component, one real component and one imaginary component calculated for each of the two line-line electrode voltages. The third line-line voltage is not used since two line-line electrode voltages provide a complete model for the three phase arc (i.e. the sum of three line-line voltages is always zero).

For N=32 samples per AC cycle:

$$f(t) = a_0 + \sum_{n=1}^{\infty} a_n \sin(n\omega t) + \sum_{n=1}^{\infty} b_n \cos(n\omega t)$$

$$a_0 = \frac{1}{\pi} \int_0^{2\pi} f(\omega t) d(\omega t)$$

$$a_n = \frac{1}{\pi} \int_0^{2\pi} f(\omega t) \sin(n\omega t) d(\omega t)$$

$$b_n = \frac{1}{\pi} \int_0^{2\pi} f(\omega t) \cos(n\omega t) d(\omega t)$$

And for the fundamental component (i.e. n=1), using trapezoidal numerical integration method, it can be shown that:

$$[DC] \Rightarrow a_0 \cong \frac{1}{2(N-1)} \left[ 2 \left\{ \sum_{i=1}^{N} f^*(i) \right\} - f^*(1) - f^*(N) \right]$$

$[Real] \Rightarrow a_1 =$ $$\frac{1}{(N-1)} \left[ 2 \left\{ \sum_{i=1}^{N} f^*(i) \times \sin\left[\frac{2\Omega}{(N-1)}(i-1)\right] \right\} - f_a^*(1) - f_a^*(N) \right]$$

$[Imaginary] \Rightarrow b_1 =$ $$\frac{1}{(N-1)} \left[ 2 \left\{ \sum_{i=1}^{N} f^*(i) \times \cos\left[\frac{2\Omega}{(N-1)}(i-1)\right] \right\} - f_b^*(1) - f_b^*(N) \right]$$

where:

$$f_a^*(i) = f(i) \sin\left[2\pi \frac{i-1}{n-1}\right]$$

$$f_b^*(i) = f(i) \cos\left[2\pi \frac{i-1}{n-1}\right]$$

To minimize the discretization error associated with RDFS, the sampling time of the data acquisition system should be an integer multiple of the period (T). This requirement is fulfilled by the microcontroller 43 (MC68332) which provides on-line frequency calculation and implements a software phase-locked-loop to maintain a fixed integer ratio of 32 between the AC system frequency and the sampling rate.

At successive address locations of the look-up table stored in microcontroller 43, respective delay angles ($\alpha$) are stored. For example, if the range of DC components for $V_{arc,AB}$ is $-100$ to $+100$ volts and only sixteen steps are used, and an index "i" represents this variable, a value of 50 results in an index "i" of 4. Similarly, based on the actual values of all other variables, other indices "j", "k", "l", "m" and "n" are calculated. This gives the address of the location in the look-up table of microcontroller 43 where the corresponding precalculated delay angle ($\alpha$) is stored.

Thus, upon generation of the DC component, real component and imaginary component for each of the two line-line electrode voltages, the index calculations are performed and the calculated index values are transmitted to microcontroller 43. In addition to the six indices sent to microcontroller 43, additional input values are transmitted for diagnostics/protection, as discussed in greater detail below. More particularly, the DSP 41 of microcontroller 43 appends appropriate information to certain files in a RAM-based memory location. Through an operator interface (PC-side code shown in the flow-chart of FIG. 8), the system operation information gets updated and can be accessed by the arc furnace operator. The general operation description discussed above in connection with FIGS. 2 and 3 is set out in further detail with reference to the flow charts of FIGS. 4, 5, 6 and 8, and the timing diagram of FIG. 7. It should be noted that operation of microcontroller 43 is interrupt driven so that while the microcontroller 43 is waiting to receive interrupts, it performs other activities such as diagnostics/protection, etc.

Figure 4A:
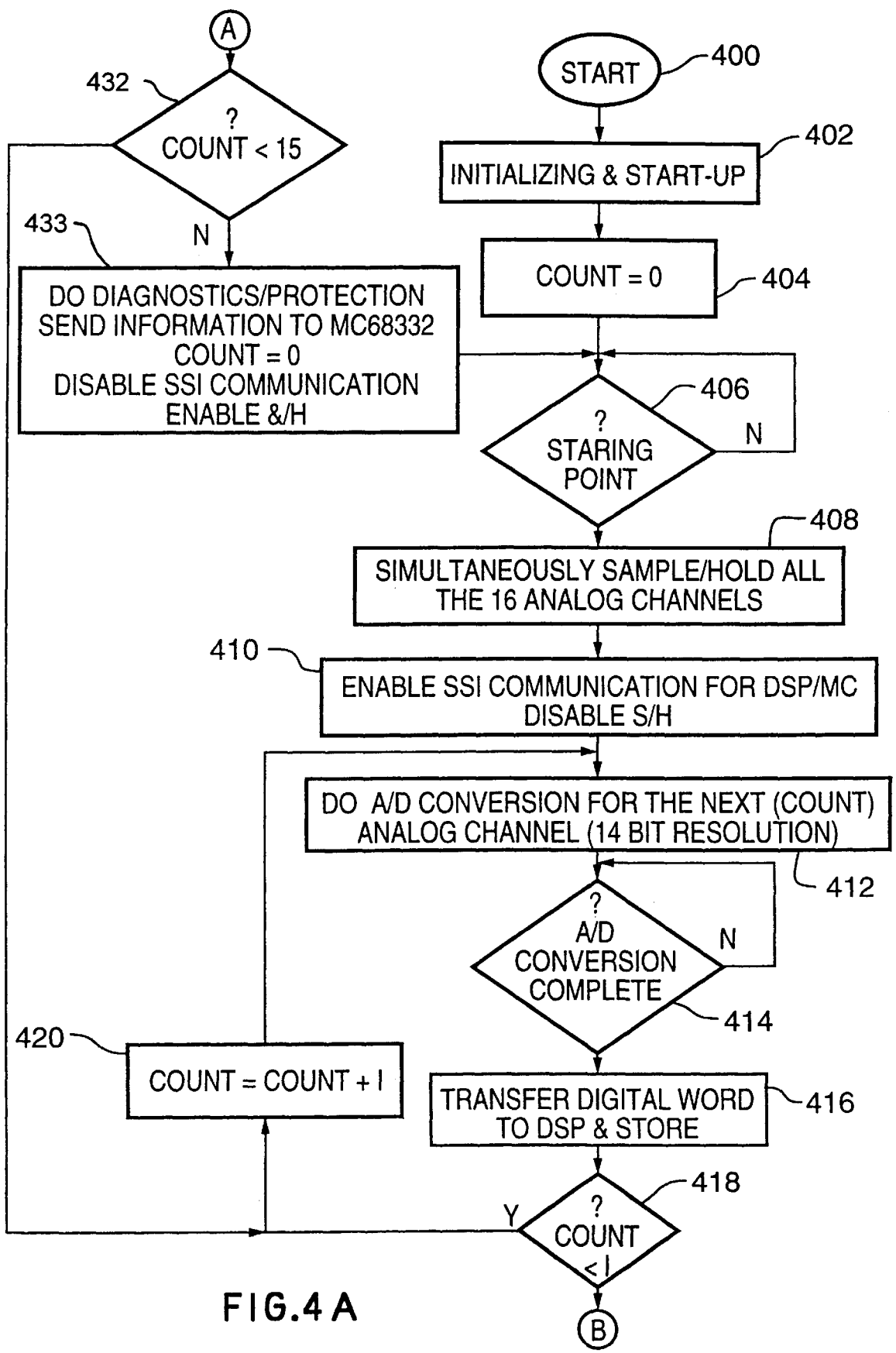
FIG. 4, comprising parts 4A and 4B, is a flow chart showing operation of the digital signal processor of FIG. 3.
Figure 4B:
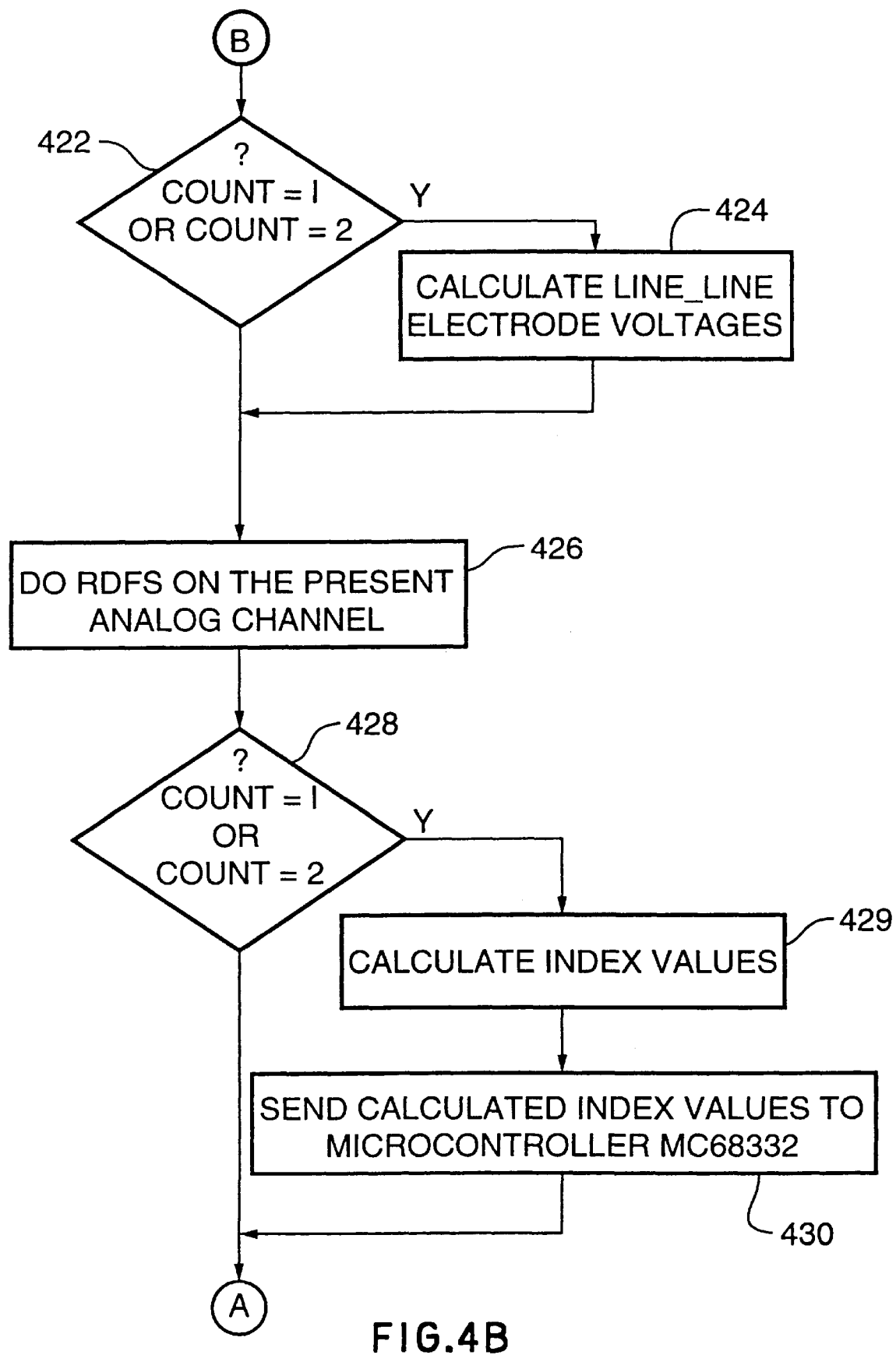

Turning to FIG. 4 (i.e. comprising FIGS. 4A and 4B), program flow begins at 400. After initialization and start-up 402, an internal count register of microcontroller 43 is set to zero (step 404). Count=0 corresponds to channel zero of DSP 41, count=1 corresponds to channel 1, etc., and count=15 corresponds to channel 15 of the DSP 41.

Figure 7:
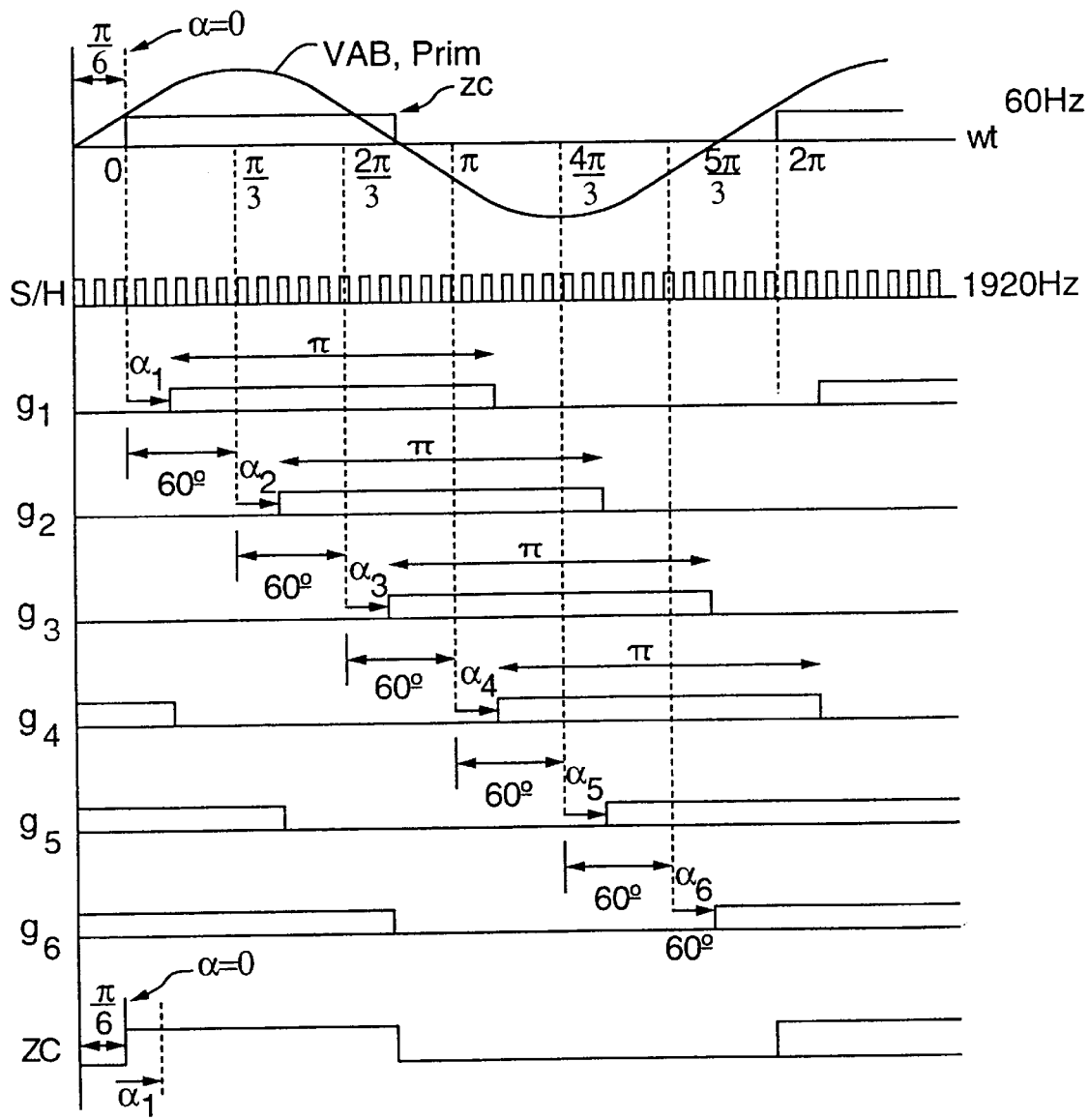
FIG. 7 is a gating signal timing diagram showing the timing of thyristor gating signals for the line controller of the preferred embodiment.

At step 406, a program loop is entered until occurrence of a sampling point (i.e. 32 samples per 60 Hertz cycle), as shown in FIG. 7.

Once a sampling point has occurred, the A/D converter 47 simultaneously samples and holds all 16 analog channels (i.e. channel 0–channel 15), as shown in step 408.

Next, at step 410, SSI communication is established between the DSP 41 and A/D converter 47. The sample and hold function of A/D converter 47 is then disabled.

At step 412, A/D conversion is performed by A/D converter 47 for the current analog channel. As discussed above, the A/D converter is characterized by 14 bit resolution.

At step 414, a program loop is entered until the A/D conversion is complete.

Upon completion of the A/D conversion, the 16 bit digital word is transferred from A/D converter 47 to DSP 41 (bits 14 and 15 being zero-filled, as discussed above).

If the count value is less than 1 (step 418), the count value is incremented (420) and program flow returns to step 412.

If the count value is 1 or greater (step 418), a determination is made as to whether the count value equals 1 or 2 (step 422). According to the embodiment shown, channel zero comprises the furnace arc voltage for phase A relative to virtual ground ($V_{arc,A}$), channel 1 corresponds to the furnace arc voltage B relative to virtual ground ($V_{arc,B}$), and channel 2 corresponds to the furnace arc voltage phase C relative to virtual ground ($V_{arc,C}$).

Thus, if count equals 1 at step 422, the first electrode line-line voltage $V_{arc,AB}$ is calculated at step 424. Likewise, if count equals 2 at step 422, the second line-line electrode voltage $V_{arc,BC}$ is calculated at step 424.

If count equals 3 or greater at step 422, program flow proceeds immediately to step 426 for calculating the Running Discrete Fourier Series (RDFS) on the current analog channel using DSP 41.

According to the embodiment shown, channels 3, 4 and 5 correspond to the phase A, phase B and phase C primary currents, respectively, which are also used for diagnostics, as discussed in greater detail below. Channel 6 corresponds to the arc furnace primary line-line voltage $V_{AB,prim}$, channel 7 corresponds to the arc furnace primary line-line voltage $V_{BC,prim}$ and channel 8 corresponds to the arc furnace primary voltage $V_{CA,prim}$. Channels 9, 10, 11 comprise the arc furnace secondary line-virtual ground voltage $V_{A,sec}$, $V_{B,sec}$ and $V_{C,sec}$.

For arc furnace model identification, only RDFS on two line-line electrode arc voltages ($V_{arc,AB}$, and $V_{arc,BC}$) is required, for the reasons discussed above. However, according to the successful prototype of the invention disclosed herein, line-virtual ground voltages at the secondary of the furnace transformer are measured to provide for control system flexibility. This allows for the monitoring of flexible inductance variations on-line. At step 428, a determination is again made to see if count equals 1 or 2. If yes, the index values for $V_{arc,AB}$ and $V_{arc,BC}$ are calculated (step 429), and transmitted to microcontroller 43 (step 430).

If the index values are calculated from DC, Re and Im components of the RDFS applied to each of the line-line electrode voltages, RDFS for some other channels are required for active/reactive power calculations and software based protection and diagnostics (e.g. software based overload current protection).

In step 432, a determination is made as to whether the count value is less than or equal to 15. If yes, count is incremented (step 420), and the A/D conversion and index value calculation is performed on the next channel, as set forth in steps 412 to 430. As indicated above, channels 14 and 15 are considered spares, there being no analog input signals corresponding to these channels.

If the determination at step 432 is that count is greater than 15, then diagnostic/protection is performed (see FIG. 8). At step 433, the data necessary for diagnostic/protection is transmitted to microcontroller 43, count is reset to zero, SSI communication between DSP 41 and A/D converter 47 is disabled, and the sample/hold function of A/D converter 47 is re-enabled.

Figure 5:
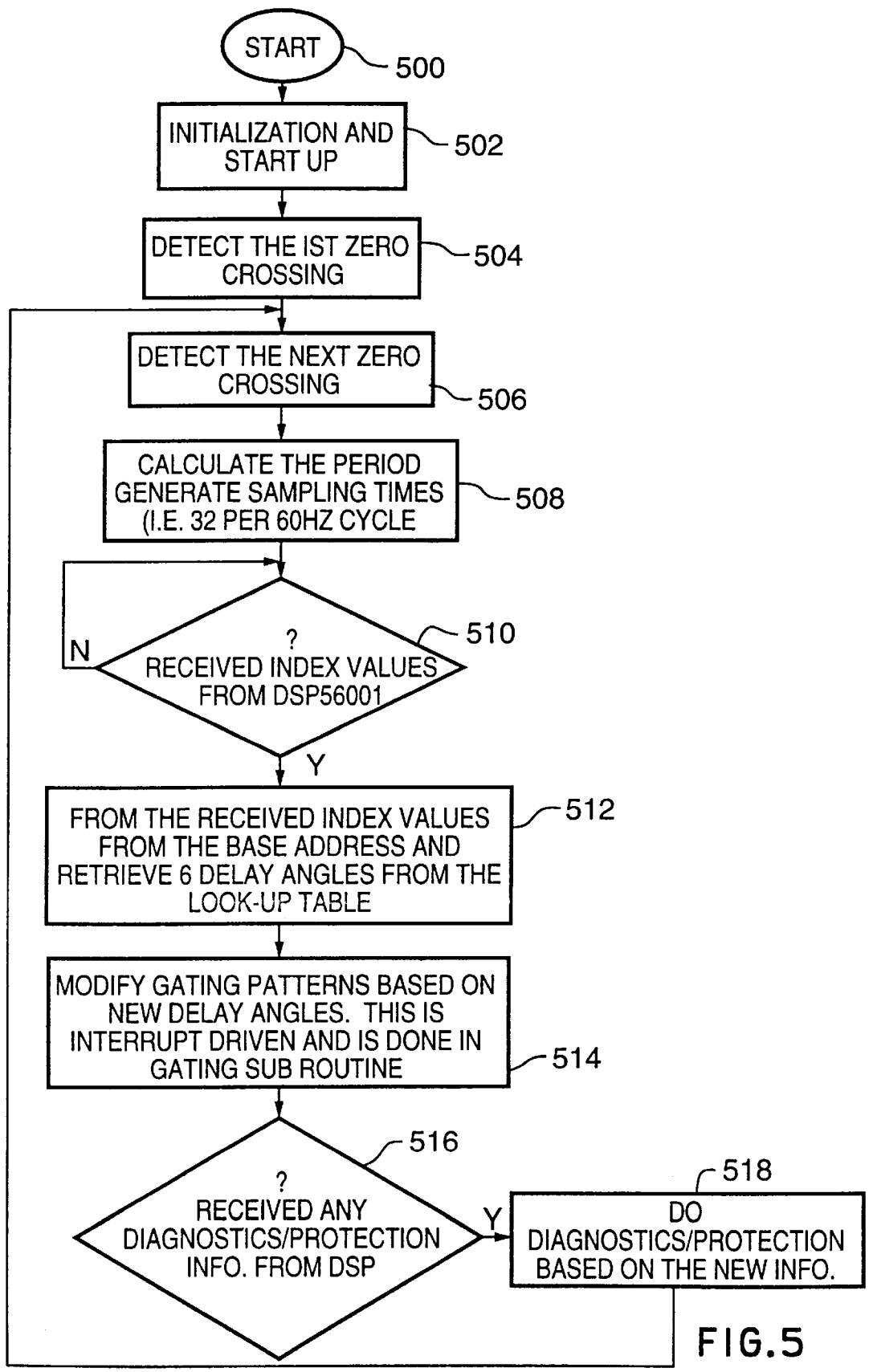
FIG. 5 is a flow chart showing operation of the microcontroller of FIG. 3.

Turning to FIG. 5, the gating subroutine performed by microcontroller 43 is set forth in detail. Program flow begins at step 500.

After initialization and start-up (step 502), the first zero crossing of the line-line voltage ($V_{AB,prim}$) is detected (step 504). Turning briefly to FIG. 7, the first zero crossing (ZC) is shown occurring at π/6 after the actual zero crossing of the line-line voltage ($V_{AB,prim}$) at the point of common coupling of the primaries of the power transformers 9A, 9B, as discussed above.

At step 506, the next zero crossing of $V_{AB,prim}$ is detecte (ZC).

At step 508, microcontroller 43 calculates the period of the synchronization voltage signal $V_{AB,prim}$ and it generates the appropriate sampling times (i.e. 32 samples per 60 Hertz cycle), as shown in the second line of FIG. 7 (S/H).

At step 510, microcontroller 43 awaits an interrupt from the DSP 41 for receiving the index values. Once the index values are received (step 512), the base address is formed by microcontroller 43 from the index values and used to retrieve the six thyristor delay angles (α1–α6) from the internal look-up table.

At step 514, the gating patterns are modified based on the received delay angles α1–α6, as shown in lines 3–8 of FIG. 7. The modification of gating patterns as set forth in step 514 is interrupt driven, as set forth in the gating subroutine of FIG. 6.

At step 516, the microcontroller 43 awaits a further interrupt from the DSP 41 for receiving diagnostics/ protection data therefrom. If microcontroller 43 receives such an interrupt, program flow branches to step 518 for diagnostics/protection based on the received data, as discussed in greater detail below with reference to FIGS. 8A, 8B and 8C. If no diagnostic/protection data has been received from the DSP 41, program flow returns to step 506 for calculating the next sampling period. As will be appreciated, by continually re-calculating the sampling period, generating index values and delay angle values, real-time predictive modelling is used to maintain accurate flicker reduction within the arc furnace.

Figure 6:
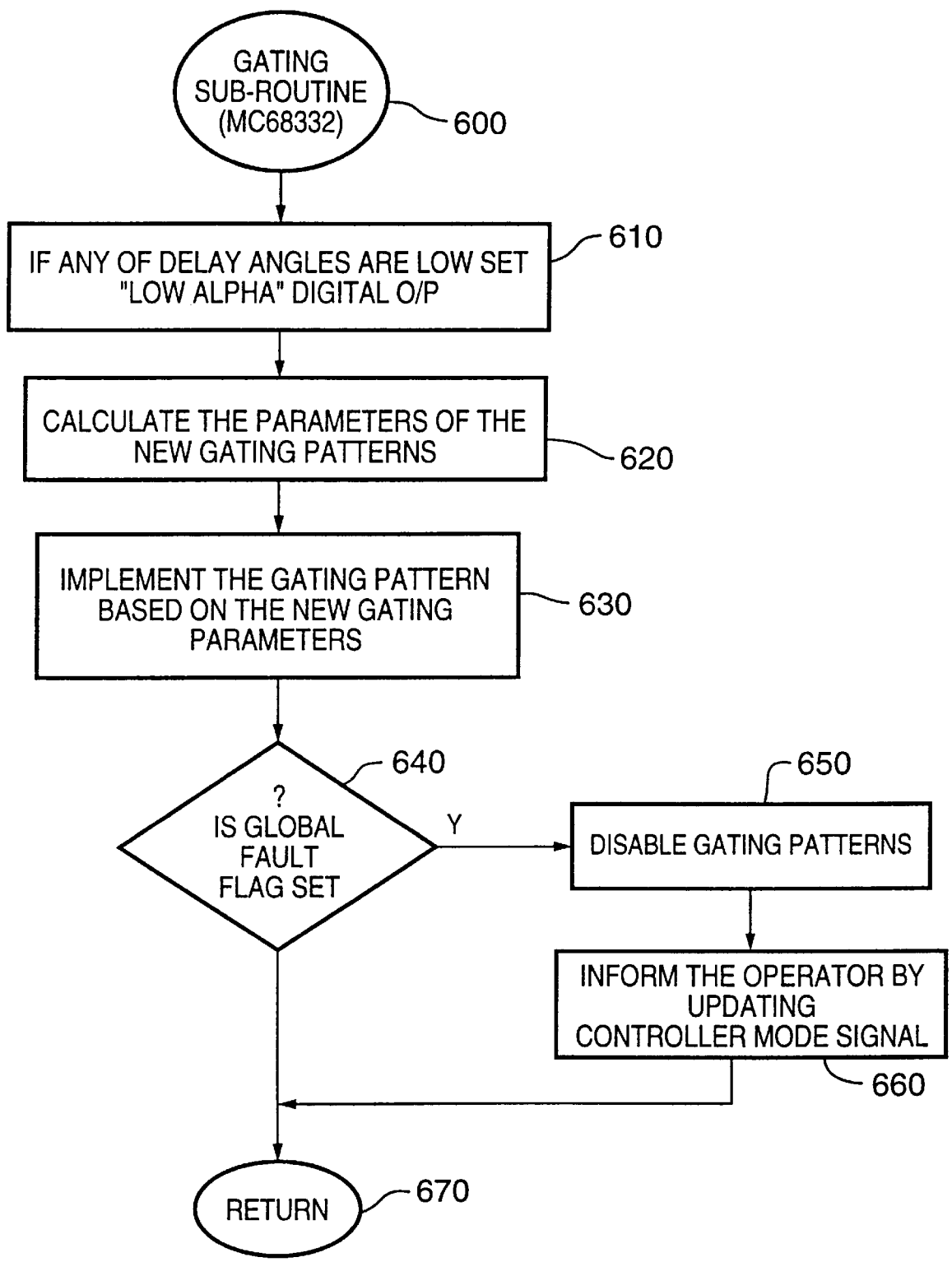
FIG. 6 is a gating sub-routine for the microcontroller flowchart of FIG. 5.

With reference to FIG. 6, the gating subroutine for microcontroller 43 is depicted. The subroutine is entered at step 600. If any of the delay angles (α1–α6) are low, the digital output is set at "low α".

The delay angle is considered to be "low" if it is below a certain delay necessary to measure minimum anode-to-cathode voltage ($V_{AK}$) (around 50 volts) across each thyristor switch of the stack. For delay angles below this "low alpha", thyristor "ACLC device faults" (explained below) will be overridden and the gating signals will not be inhibited.

A low delay angle means that the AC switches 19 remain mostly on. Each thyristor's voltage is continuously measured for protection against blown devices. When a thyristor "blows" it appears as a short circuit. Therefore, if a "low alpha" situation is not announced to the protection circuitry (gating block 1130 in FIG. 11), the gating signals would be disabled due to the wrong assumption of a fault.

At step 620, the parameters of the new gating patterns are calculated (see FIG. 7).

At step 630, the gating pattern is implemented based on the new gating parameters. Parameters of the gating patterns are defined in FIG. 7 and include: six delay angles ($\alpha_1, \alpha_6$), system frequency calculated on line, and the on-line adaptive sample and hold (S/H) sampling signals (generated on-line by a software based phase-locked loop).

At step 640, the microcontroller 43 determines whether a global fault flag has been set. If the flag has been set, the gating patterns are disabled (step 650) and the arc furnace operator is informed by updating of a controller mode signal (step 660).

Return from subroutine interrupt occurs at step 670.

Figure 8A:
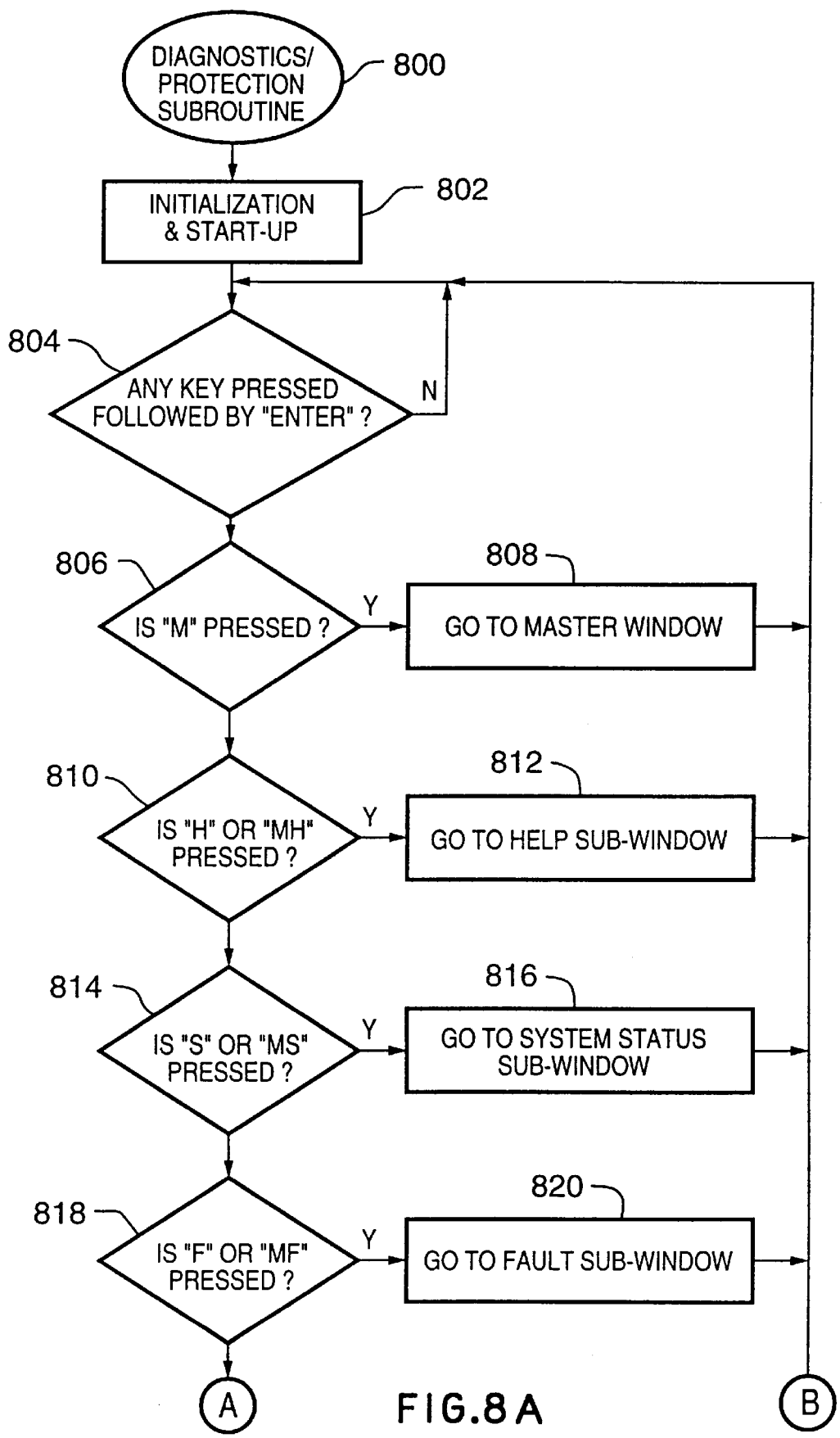
FIGS. 8A, 8B and 8C together comprise a flow chart showing diagnostics/protection operation according to the preferred embodiment.
Figure 8B:
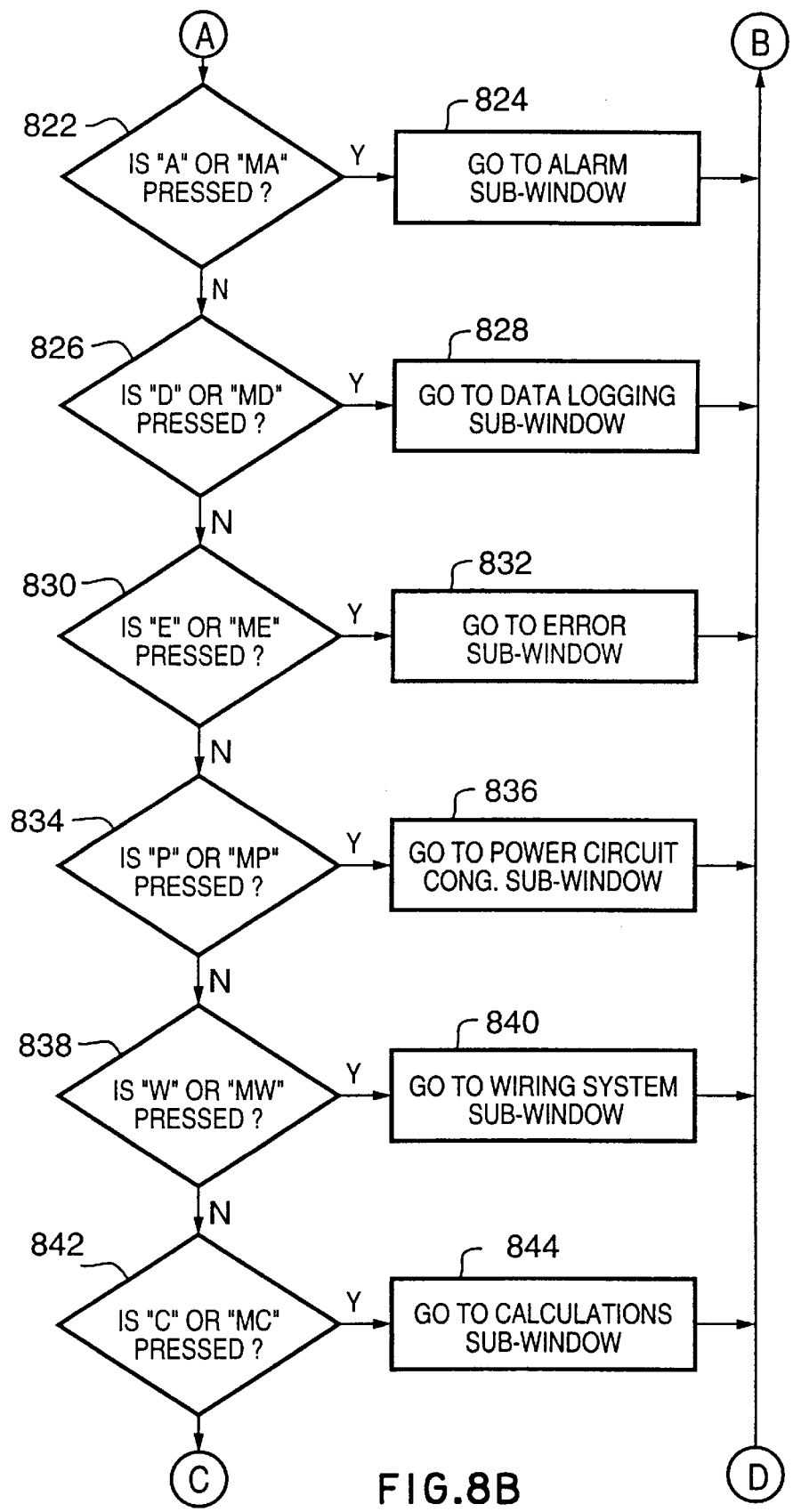
Figure 8C:
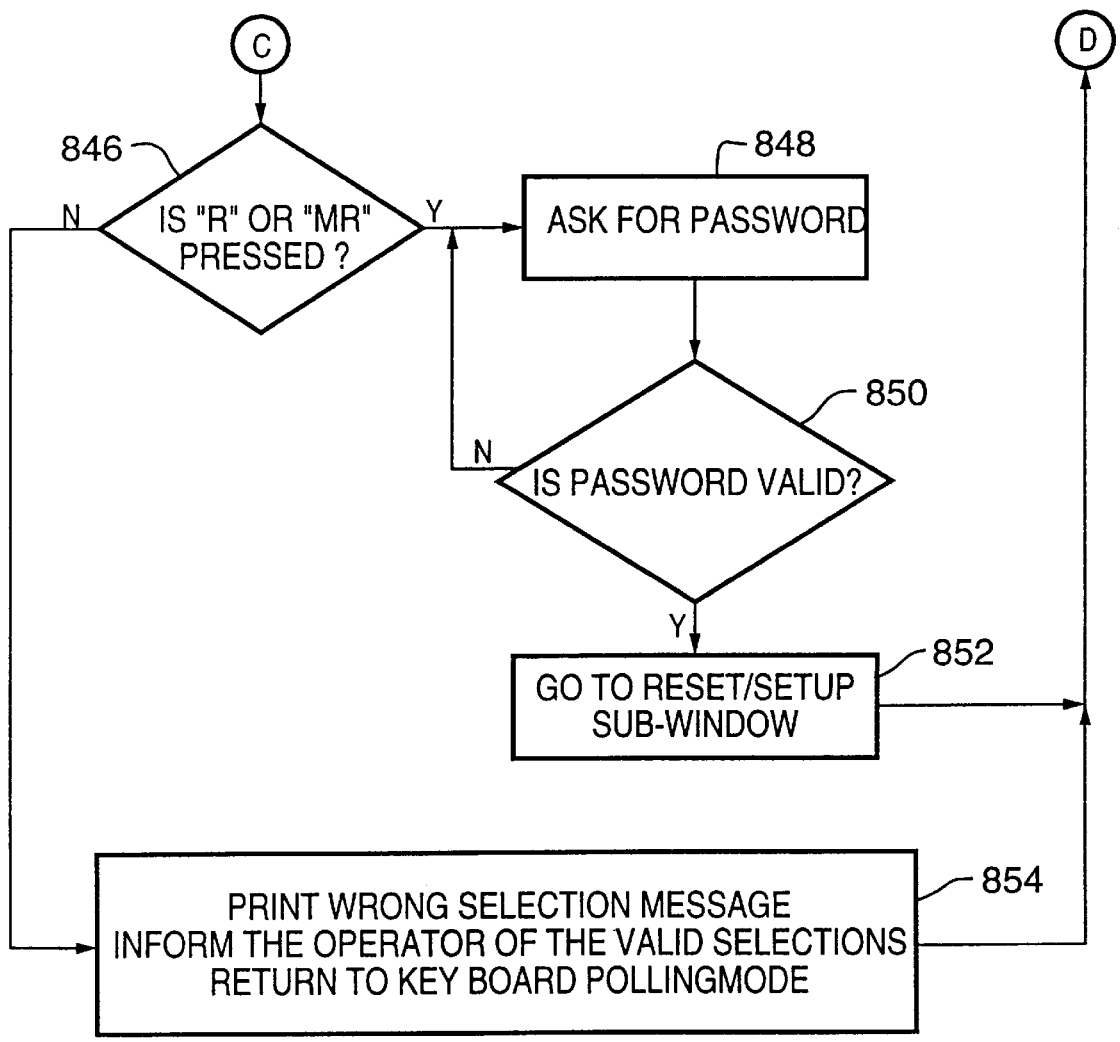

FIGS. 8A, 8B and 8C show the PC-side code for operator interface software which updates system operation information, as discussed briefly above. The operator interface diagnostics/protection subroutine begins at step 800.

After initialization and start-up (step 802), the system determines whether any key has been pressed followed by a carriage return (step 804). This loop is continued until such time as a key has been pressed.

At step 806, if the "M" key has been pressed, program flow proceeds to the master window (step 808), as shown in Table A.

TABLE A

| Main Menu | System Status | |
|---|---|---|
| H. Help | Lasco Go: Off | 5 |
| S. SystemStatus | Gate Enable: Off | |
| M. MainMenu | System OFF Line | |
| F. Fault [Hard Wired] | RFile: Closed | |
| A. Alarm | Size: 0 Kb | |
| D. Data Logging System | Phase: 0.0 deg | |
| E. Any Error [Processor Based] | IA. 0.0 rms | 10 |
| P. Power Circuit Configuration | IB: 0.0 rms | |
| W. Wiring System Check | IC: 0.0 rms | |
| C. Calculations | | |
| R. Reset/Setup | Alarm | |
| T. Test | Alpha < Low Alpha | |
| | | 15 |
| Message: Use Keyboard to enter a selection | | |

Otherwise, the system determines if the "H" or "MH" keys have been pressed. If yes, program flow proceeds to the help sub-window (step 812), as shown in Table B.

TABLE B

| MAIN MENU HELP WINDOW | SYSTEM STATUS |
|---|---|
| To go to any of the subwindows listed in the main menu window, type the letter which appears before the window name.<br><br>F1 - Displays a help window for he screen displayed<br>F2 - Enable History files<br>F3 - Disable History files<br><br><Pageup>  - Pages through the help file<br><Pagedwn> - Page through the help file<br><Escape>   - Exit help window, return to prev. scrn<br><br><Cntrl Q>  - exit application. (only from reset menu) | Lasco Go:   Off<br>Gate Enable: Off<br>System OFF Line<br>RFile: Closed<br>Size:  0 Kb<br>Phase:   0.0 deg<br>IA:      0.0 rms<br>IB:      0.0 rms<br>IC:      0.0 rms<br><br>Alarm<br>Alpha < Low Alpha |

Message: <ESCAPE> to exit, <PAGE UP> and <PAGE DOWN> to view

Otherwise, the system determines whether the "S" or "MS" keys have been pressed. If yes, program flow proceeds to the system status subwindow (step 816), as shown in Table C.

TABLE C

```
┌═══════SYSTEM STATUS═══════┐  ┌═══════SYSTEM STATUS═══════┐
│                           │  │                           │
│ Lasco Go:   Off           │  │ Lasco Go:   Off           │
│ Gate Enable: Off          │  │ Gate Enable: Off          │
│ System OFF Line           │  │ System OFF Line           │
│ RFile: Closed             │  │ RFile: Closed             │
│ Size:   0 Kb              │  │ Size:   0 Kb              │
│ Phase:    0.0 deg         │  │ Phase:    0.0 deg         │
│ IA:       0.0 rms         │  │ IA:       0.0 rms         │
│ IB:       0.0 rms         │  │ IB:       0.0 rms         │
│ IC:       0.0 rms         │  │ IC:       0.0 rms         │
│                           │  │                           │
│ Alarm                     │  │ Alarm                     │
│ Alpha < Low Alpha         │  │ Alpha < Low Alpha         │
│                           │  │                           │
└───────────────────────────┘  └───────────────────────────┘

┌──────────────────────────────────────────────────────────┐
│ Message: Type M for MAIN MENU. <ESC> for previous screen!│
└──────────────────────────────────────────────────────────┘
```

Otherwise, the system determines whether the "F" or "MF" keys have been pressed. If yes, program flow proceeds to the fault subwindow (step 820), as shown in Table D ceeds to the alarm subwindow (step 824), as shown in Table E (although it should be noted that the conditions shown in

TABLE D

```
┌═══════FAULT WINDOW═══════┐  ┌═══════SYSTEM STATUS═══════┐
│                          │  │                           │
│                          │  │ Lasco Go:   Off           │
│                          │  │ Gate Enable: Off          │
│                          │  │ System OFF Line           │
│                          │  │ RFile: Closed             │
│                          │  │ Size:   0 Kb              │
│                          │  │ Phase:    0.0 deg         │
│                          │  │ IA:       0.0 rms         │
│   NO FAULTS ON SYSTEM    │  │ IB:       0.0 rms         │
│                          │  │ IC:       0.0 rms         │
│                          │  │                           │
│                          │  │ Alarm                     │
│                          │  │ Alpha < Low Alpha         │
│                          │  │                           │
│                          │  │                           │
└──────────────────────────┘  └───────────────────────────┘

┌──────────────────────────────────────────────────────────┐
│ Message: Type M for MAIN MENU. <ESC> for previous screen!│
└──────────────────────────────────────────────────────────┘
```

Otherwise, the system determines whether the "A" or "MA" keys have been pressed. If yes, program flow pro- the subwindows presented herein are examples only, and in normal operation no alarms would typically be generated).

TABLE E

| ALARM WINDOW | SYSTEM STATUS |
|---|---|
| Circuit Breaker Open<br>Input Switch Error<br>Capacitor Bank Error<br>ByPass Error | Lasco Go:    Off<br>Gate Enable: Off<br>System OFF Line<br>RFile: Closed<br>Size:   0 Kb<br>Phase:    0.0 deg<br>IA:       0.0 rms<br>IB:       0.0 rms<br>IC:       0.0 rms<br><br>Alarm<br>Alpha < Low Alpha |

Message: Type M for MAIN MENU. <ESC> for previous screen!

Otherwise, the program determines whether the "D" or "MD" keys have been pressed. If yes, program flow proceeds to the data logging subwindow (step 828), as shown in Table F.

TABLE F

| DATA LOGGING OPERATION | SYSTEM STATUS |
|---|---|
| Manual Data Logging Operation | Lasco Go:    Off<br>Gate Enable: Off<br>System OFF Line<br>RFile: Closed<br>Size:   0 Kb<br>Phase:    0.0 deg<br>IA:       0.0 rms<br>IB:       0.0 rms<br>IC:       0.0 rms<br><br>Alarm<br>Alpha < Low Alpha |

Message: Type M for MAIN MENU. <ESC> for previous screen!

Otherwise, the system determines whether the "E" or "ME" keys have been pressed. If yes, program flows proceeds to the error subwindow (step 832) as shown on Table G.

TABLE G

```
┌═══════ ERROR WINDOW ═══════┐  ┌═SYSTEM STATUS═┐
│                            │  │ Lasco Go:    Off
│                            │  │ Gate Enable: Off
│                            │  │ System OFF Line
│                            │  │ RFile: Closed
│                            │  │ Size:  0 Kb
│                            │  │ Phase:   0.0 deg
│                            │  │ IA:      0.0 rms
│   NO ERRORS ON SYSTEM      │  │ IB:      0.0 rms
│                            │  │ IC:      0.0 rms
│                            │  │
│                            │  │ Alarm
│                            │  │ Alpha < Low Alpha
│                            │  │
│                            │  │
│                            │  │
└────────────────────────────┘  └───────────────┘

┌──────────────────────────────────────────────┐
│ Message: Type M for MAIN MENU. <ESC> for previous screen! │
└──────────────────────────────────────────────┘
```

Otherwise, the system determines whether the "P" or "MP" keys have been pressed (step 834 in FIG. 8*b*). If yes, program flow proceeds to the power circuit configuration subwindow (step 836) as shown in Table H.

TABLE H

```
┌═══POWER CIRCUIT CONFIGURATION═══┐  ┌═SYSTEM STATUS═┐
│ Circuit breaker Switch:    Open │  │ Lasco Go:    Off
│ DS7 - Controller Out Switch: Open│  │ Gate Enable: Off
│ DS6 - Controller In Switch:  Open│  │ System OFF Line
│ DS5 - By Pass Switch:      Open │  │ RFile: Closed
│ DS4 - Capacitor bank:      Open │  │ Size:  0 Kb
│ DS3 - TransT4 Switch:      Open │  │ Phase:   0.0 deg
│ DS2 - Tie Switch:          Open │  │ IA:      0.0 rms
│ DS1 - TransT3 Switch:      Open │  │ IB:      0.0 rms
│                                 │  │ IC:      0.0 rms
│                                 │  │
│                                 │  │ Alarm
│                                 │  │ Alpha < Low Alpha
│                                 │  │
└─────────────────────────────────┘  └───────────────┘

┌──────────────────────────────────────────────┐
│ Message: Type M for MAIN MENU. <ESC> for previous screen! │
└──────────────────────────────────────────────┘
```

Otherwise, the system determines whether the "W" or "MW" keys have been pressed. If yes, program flow proceeds to the wiring system subwindow (step 840), as shown in Table I.

TABLE I

| WIRING SYSTEM CHECK | SYSTEM STATUS |
|---|---|
| NOT IMPLEMENTED !!! | Lasco Go: Off<br>Gate Enable: Off<br>System OFF Line<br>RFile: Closed<br>Size: 0 Kb<br>Phase: 0.0 deg<br>IA: 0.0 rms<br>IB: 0.0 rms<br>IC: 0.0 rms<br><br>Alarm<br>Alpha < Low Alpha |

Message: Type M for MAIN MENU. <ESC> for previous screen!

Otherwise, the system determines whether the "C" or "MC" keys have been pressed. If yes, program flow proceeds to the calculation subwindow (step 844), as shown in Table J.

user's password (step 848). If the password is invalid, the system repeats the request for password (step 848). If the password is valid, program flow proceeds to the reset/setup subwindow (step 852), as shown in Table K.

TABLE J

| CALCULATIONS | | | | | SYSTEM STATUS |
|---|---|---|---|---|---|
| | Ia | Ib | Ic | Phase | Lasco Go: Off |
| | 0.0 | 0.0 | 0.0 | 0.0 | Gate Enable: Off |
| | 0.0 | 0.0 | 0.0 | 0.0 | System OFF Line |
| | 0.0 | 0.0 | 0.0 | 0.0 | RFile: Closed |
| | 0.0 | 0.0 | 0.0 | 0.0 | Size: 0 Kb |
| | 0.0 | 0.0 | 0.0 | 0.0 | Phase: 0.0 deg |
| | | | | | IA: 0.0 rms |
| | | | | | IB: 0.0 rms |
| PerUnit: | 0.00 | 0.00 | 0.00 | 0.00 | IC: 0.0 rms |
| Minimum: | 0.0 | 0.0 | 0.0 | 0.0 | |
| Average: | 0.0 | 0.0 | 0.0 | 0.0 | Alarm |
| Maximum: | 0.0 | 0.0 | 0.0 | 0.0 | Alpha < Low Alpha |
| | | | | | |
| FACTOR: | 1.0 | | | | |
| INTEGRAL: | 0.0 | (Shutdown @ 100.0) | | | |

Message: Type M for MAIN MENU. <ESC> for previous screen!

Otherwise, the system determines whether the "R" or "MR" keys have been pressed. If yes, the system asks for a

TABLE K

| RESET/SETUP WINDOW | | SYSTEM STATUS |
| --- | --- | --- |
| 1. Acknowledge Error/Fault | | Lasco Go:   Off |
| | | Gate Enable: Off |
| 2. Controller Mode | Test | System OFF Line |
| | Automatic | RFile: Closed |
| | Manual | Size:   0 Kb |
| | –> StandBy | Phase:   0.0 deg |
| | | IA:   0.0 rms |
| 3. Reset for H/W protection | | IB:   0.0 rms |
| 4. Reset A4 Board | | IC:   0.0 rms |
| 5. Data Logging System Mode | Automatic | Alarm |
| | –> Manual | Alpha < Low Alpha |
| 6. System Start-up Configuration | | |
| 7. Manual Mode Parameters | | |

| Message: Password DISABLED! |
| --- |

The initialization of the system hardware and software is performed using a series of further sub-windows (not shown in FIG. 8, for the sake of simplicity).

If none of the legitimate key entries have been pressed (i.e. a determination of "N" at step 846), then the system prints a "wrong selection" message and informs the operator of valid selections, and thereafter returns to keyboard polling mode (step 854).

As discussed briefly above, channels 3–14 are used for operator diagnostics and protection of the controller according to the present invention.

There are two levels of protection provided: (1) hard wired protection, and (2) processor-based monitoring and protection.

Hard wired protection is provided to detect excessive peak voltages on each switch stack (i.e. thyristors 19), excessive current through the AC switching thyristors, any lightning arrestor conduction, SCR fault and excessive ground current.

The peak voltage across each line switch and the peak line current through the AC switching thyristors are monitored by the hardware protection board. If more than two switches per phase are short circuited, an SCR fault is detected and the gating signals (g1–g6) are disabled by the protection board. Operation at minimum delay angle is detected, and the fault SCR is disabled during such intervals (via gating circuit 1130 discussed below with reference to FIG. 11).

Processor based diagnostics/protection is used for status signals and other slow signals. The following signals are used by the microcontroller 43 for diagnostics/protection, wherein ACLC 903 denotes the AC Line Controller including the three-phase 46 kV switch, auxiliary cards and fibre optic panels. The Smart Predictive Line Controller (SPLC) of the present invention includes the ACLC 903 (FIG. 9D) and the central controller 900 (FIG. 9A), cooling system 901 (FIG. 9D), instrumentation, etc.

a) LASCO Okay (GO) signal
b) ACLC okay signal (sum of interlocks internal to the line controller)
c) AC switch overcurrent (over long time)
d) AC switch overvoltage status
e) Cooling system okay signal
f) Local device alarm
g) Local device fault
h) Ground fault status
i) AC switch peak current status
j) Disconnect switch status signals
k) Lightening arrestor status These signals and the consequential processor-based monitoring and protection are explained as follows:

a) Lasco Okay (GO) Signal

This signal (FIGS. 9B, 11F) is receive from the arc furnace and is used to enable the gating signals if the SPLC is turned on.

b) ACLC Okay Signal

This signal is received by the central controller 900 from the AC line controller (ACLC) 903 via the cooling system 901 and is used to disable the gating signals in the event the ACLC protection system is not okay.

c) AC Switch Overcurrent

The overcurrent through all the AC switches 19 is monitored versus time. The gating signals are disabled if an overcurrent of a certain magnitude is detected more than the corresponding maximum time allowed for that overcurrent (see FIG. 11H).

d) AC Switch Overvoltage Status

Local hard-wired protection against overvoltage across any of the AC switching thyristors 19 per phase (see FIG. 11).

e) Cooling System Okay Signal

An okay signal (FIG. 19D) is sent from the cooling system 901 to the central controller 900 for protection/diagnostics. More particularly, the "Cooling System Alarm" and "Cooling System Fault" signals sent to the central controller are designed to be failsafe, meaning that when neither of them is asserted the cooling system is OK (i.e. cooling system Okay signal).

f) ACLC Device Alarm

If any of the thyristors 19 is faulty, an alarm signal is sent to the microcontroller 43. (i.e. the ACLC Device Alarm is a fibre optic signal received by the gating card 1130 as shown in FIGS. 11D and 11H).

g) ACLC Device Fault

If two or more thyristors 19 per phase are faulty, a fault signal is sent to the microcontroller 43. The gating signals are disabled if such a fault occurs. (i.e. the ACLC Device Fault is a fibre optic signal received by the gating card 1130 as shown in FIGS. 11D and 11H)

h) Ground Fault Status

The sum of the three line currents should be equal to zero at all times. If this condition is not satisfied, a ground fault is detected and the status of this is sent to the central controller 900 for protection/diagnostics, as shown in FIGS. 11D.

i) AC Switch Peak Current Status

If the gating signals are disabled due to an excessive peak current through the ACLC a status signal is sent to the processor 900 for diagnostics, shown in FIG. 11 D "PEAK CURRENT (15V)".

j) Disconnect Switch Status Signals

Figure 9A:
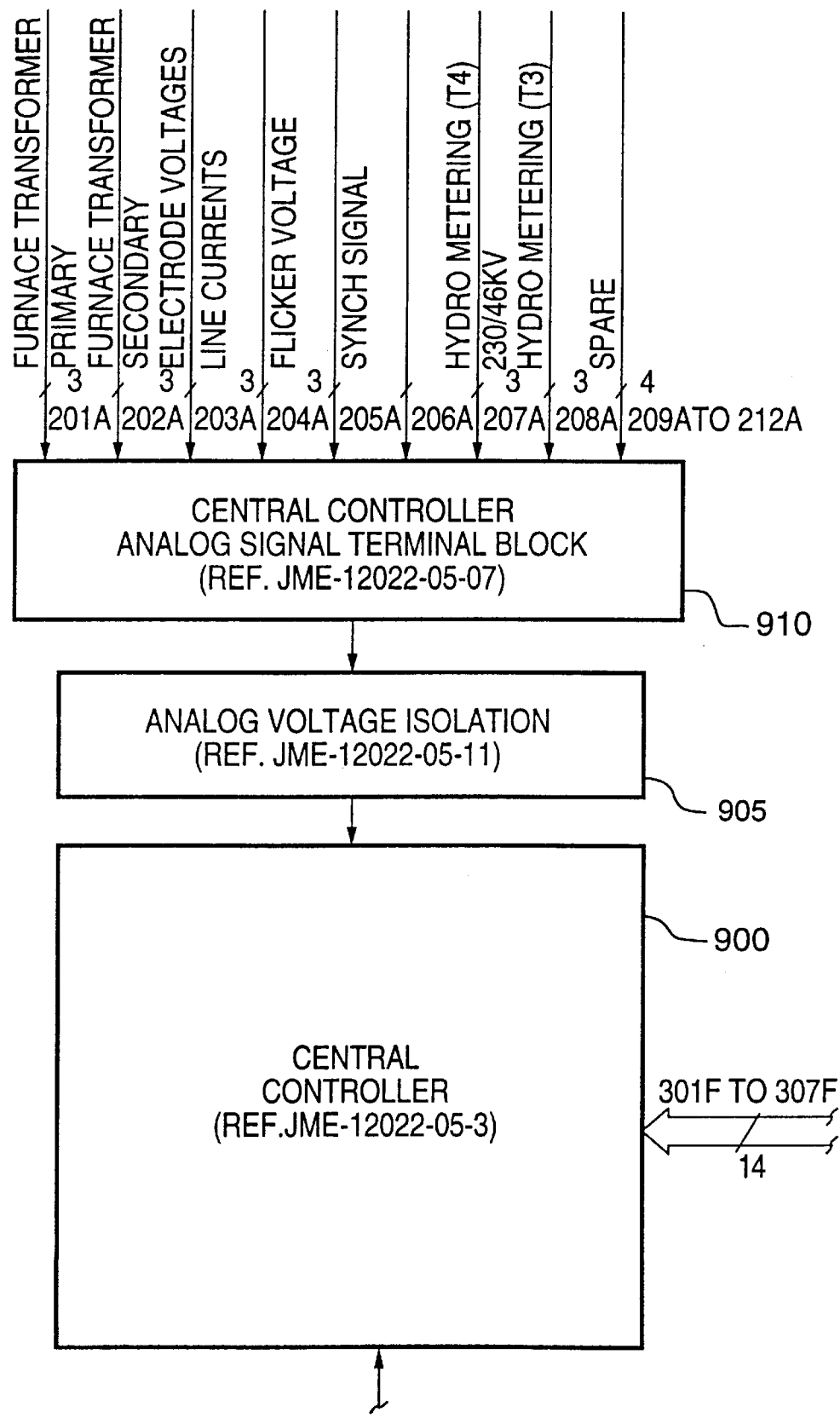
FIG. 9, comprising parts 9A–9D, is a system control interface block diagram for the line controller according to the preferred embodiment.
Figure 9B:
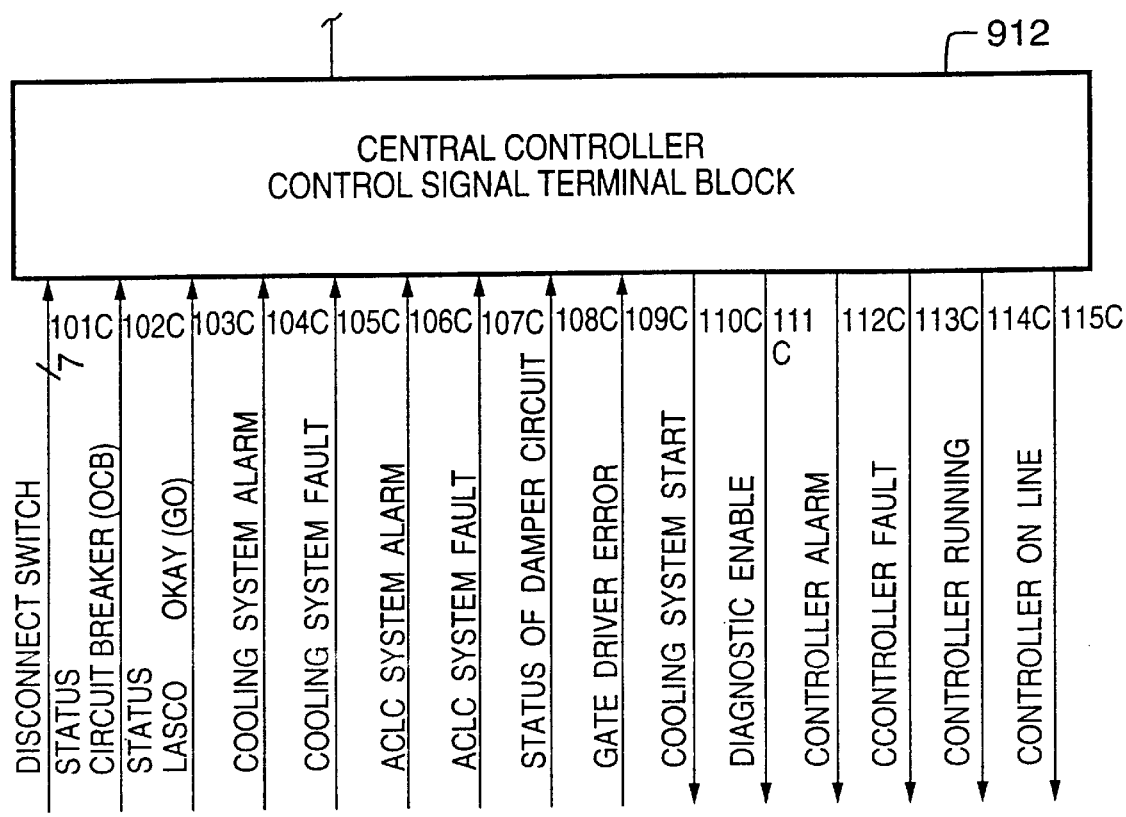
Figure 9C:
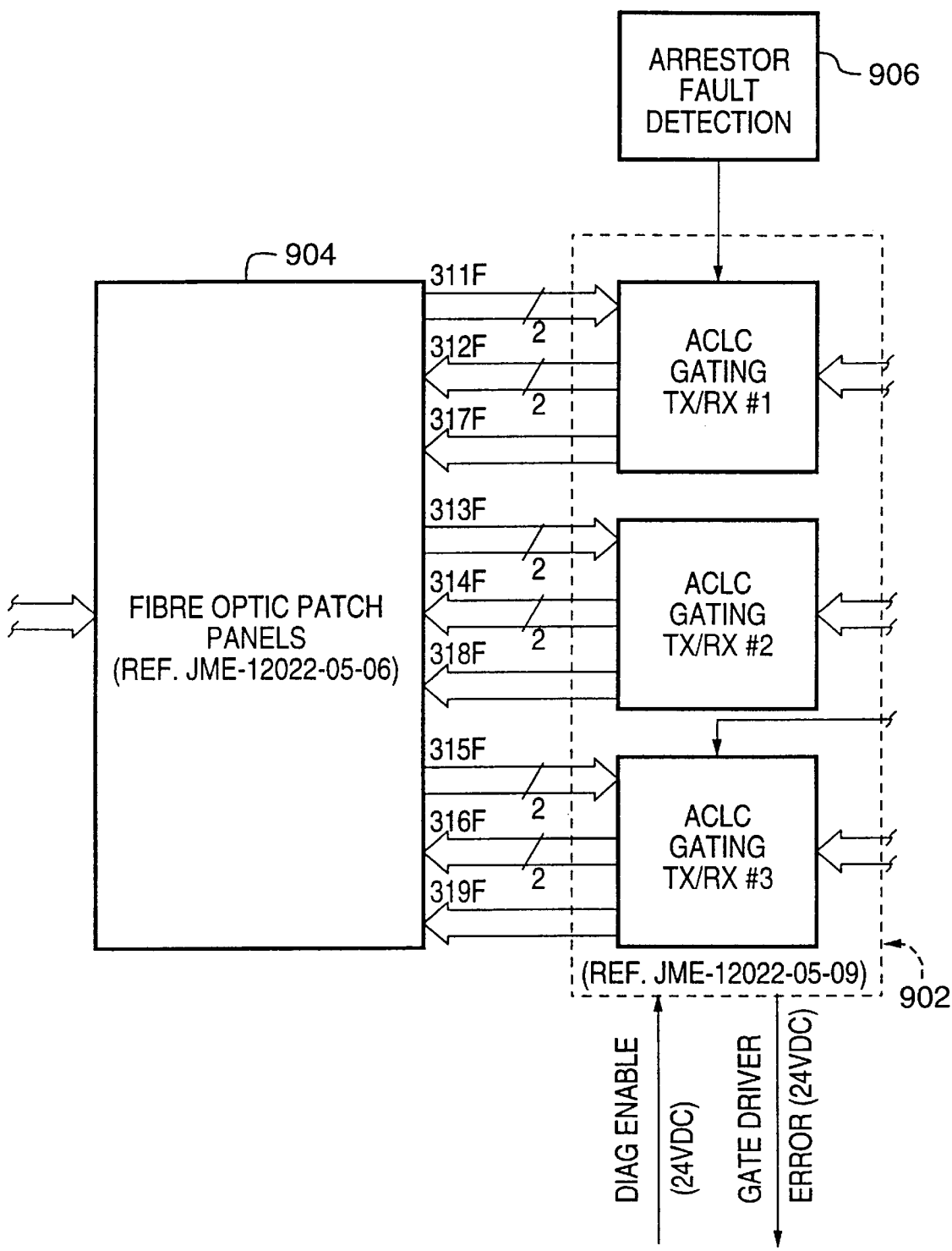
Figure 9D:
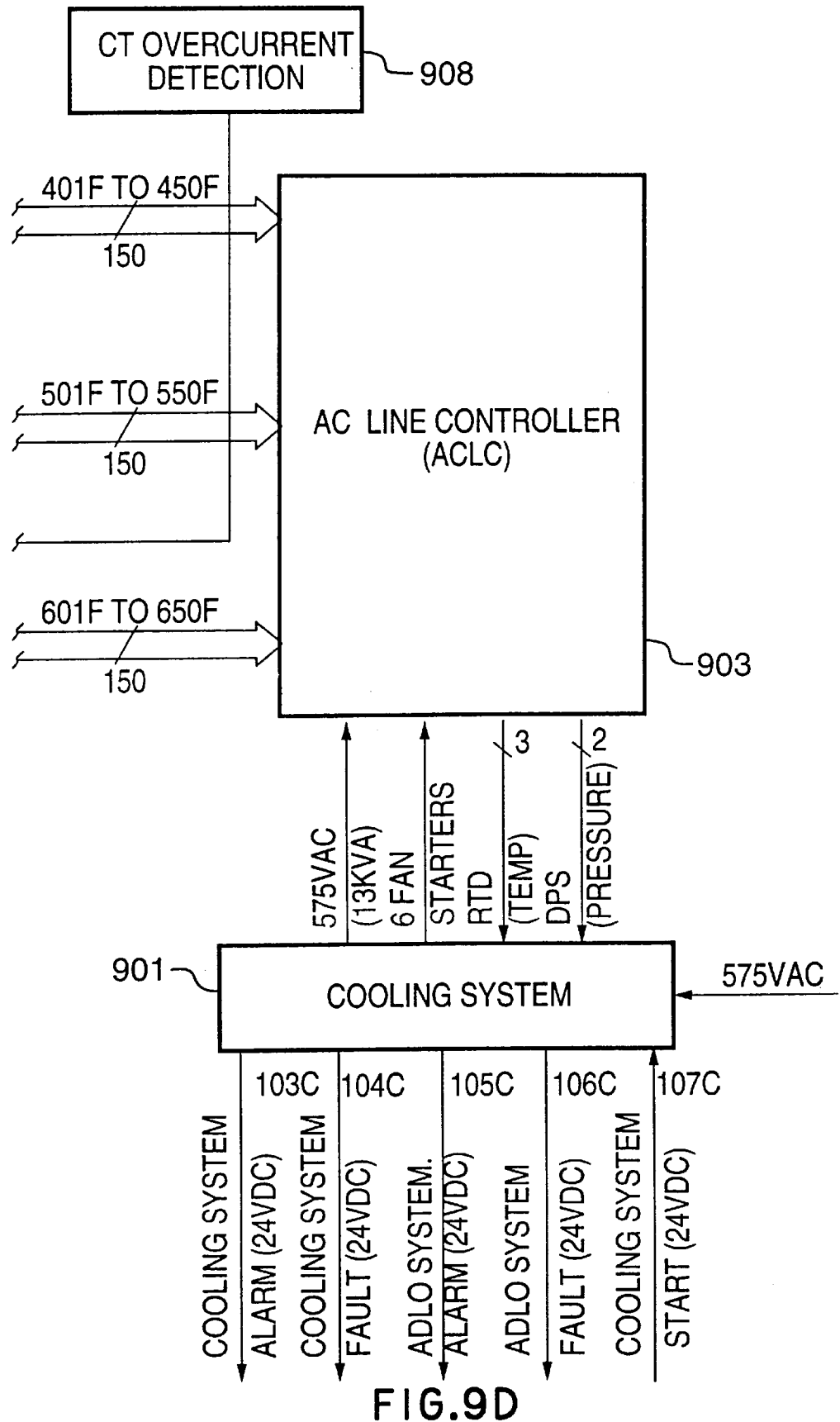
Figure 10:
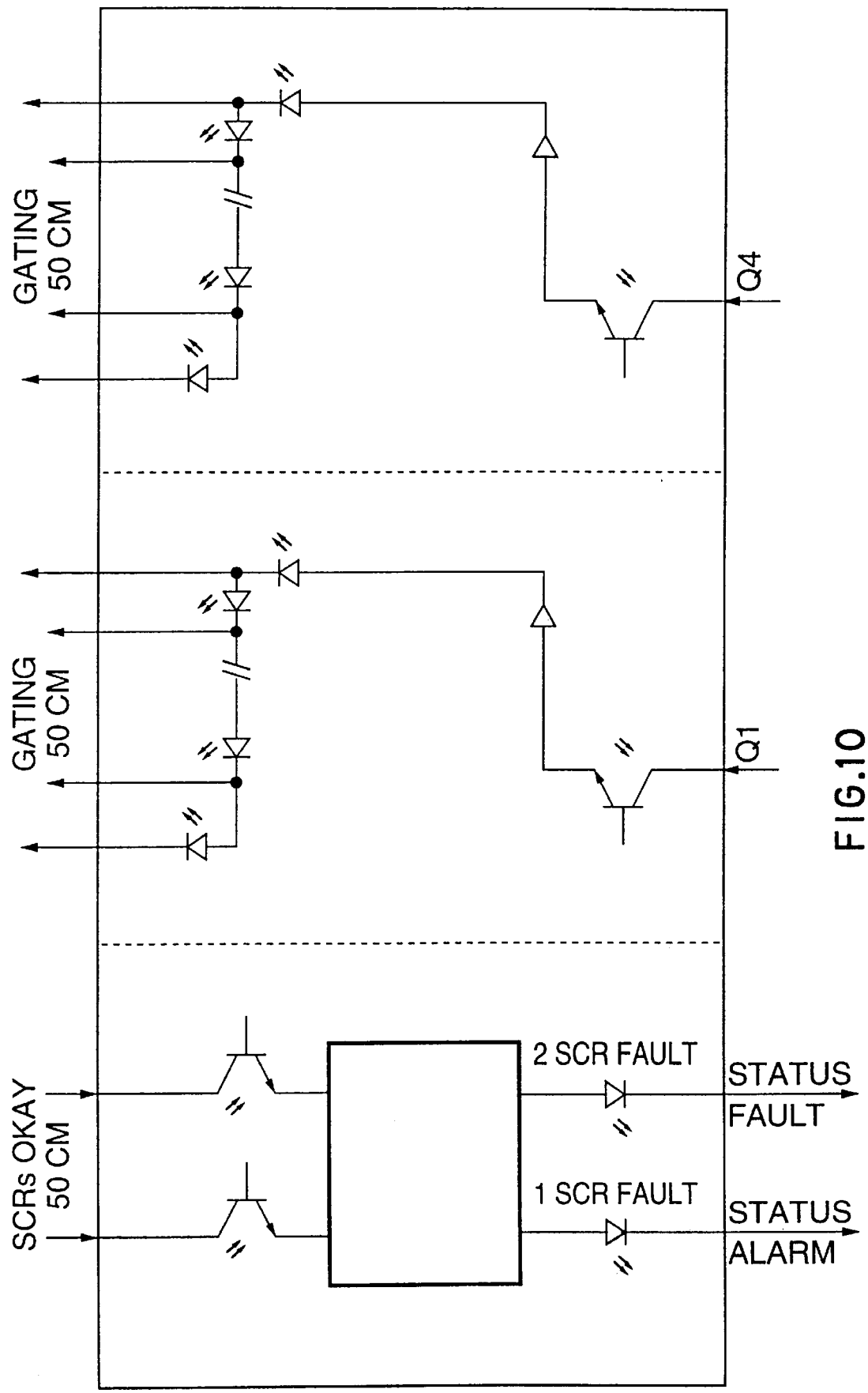
FIG. 10 is a transmitter receiver schematic diagram for the line controller according to the preferred embodiment.
Figure 11A:
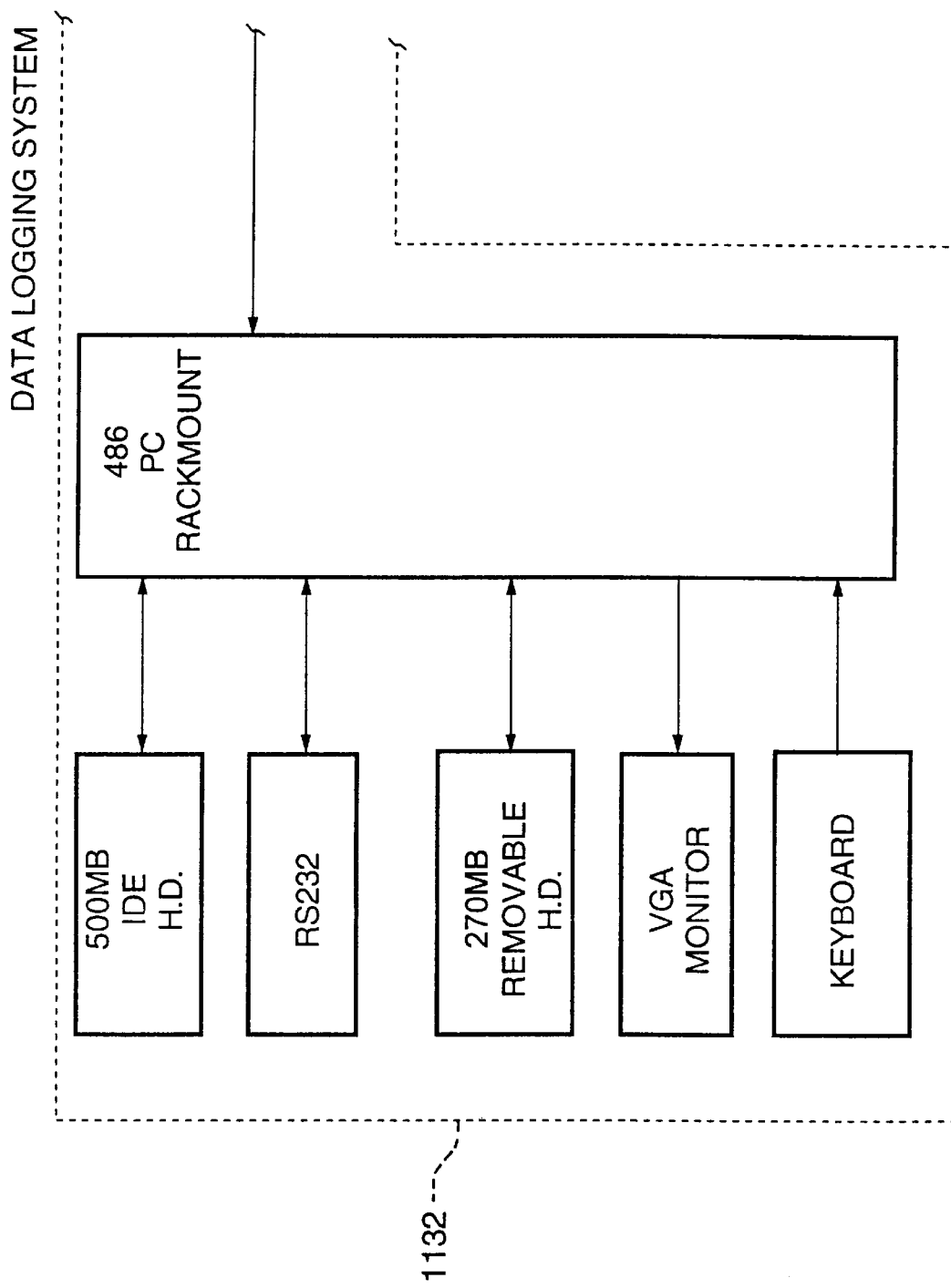
FIG. 11, comprising parts 11A–11I, is a central controller block diagram for the line controller according to the preferred embodiment.
Figure 11B:
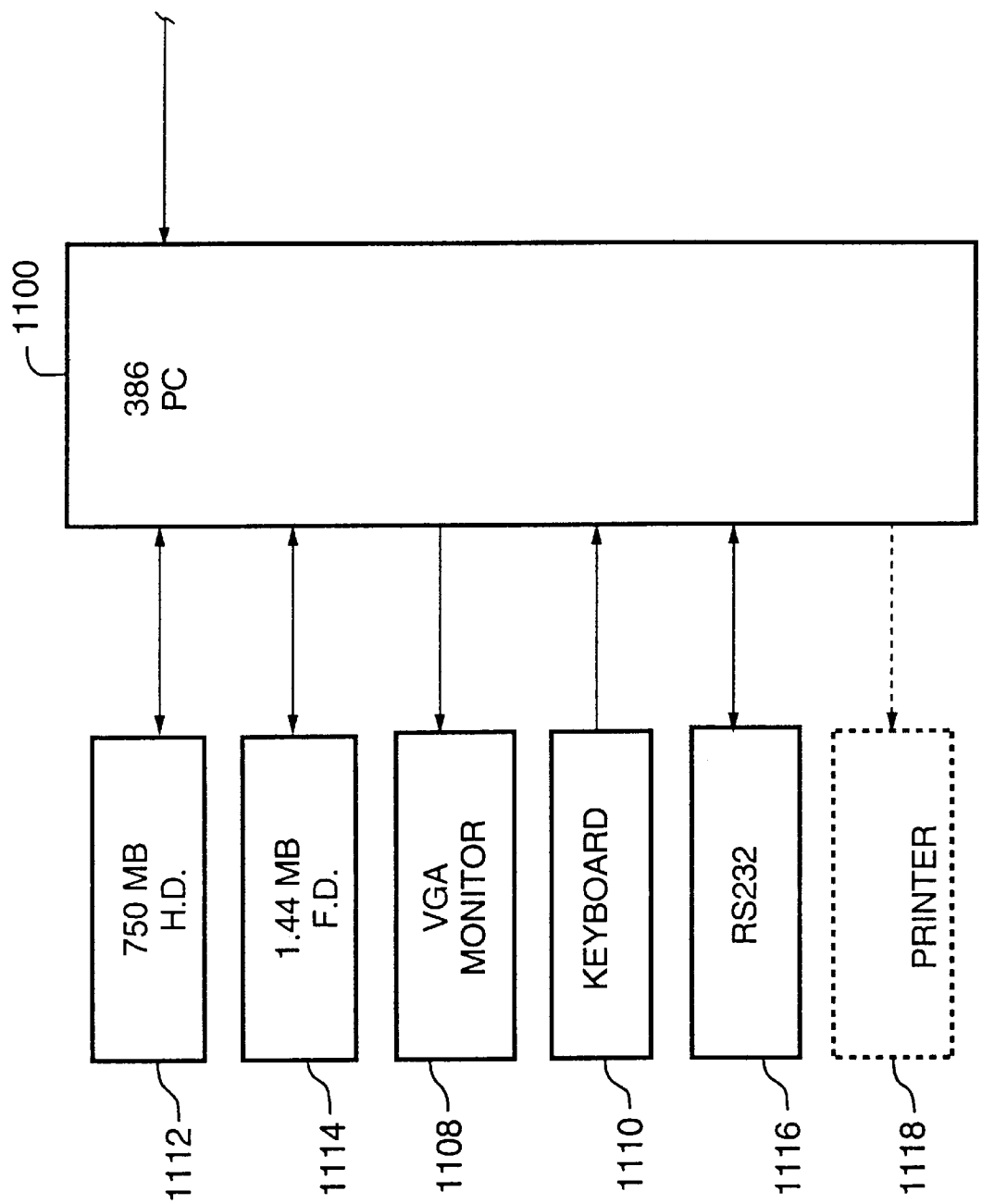
Figure 11C:
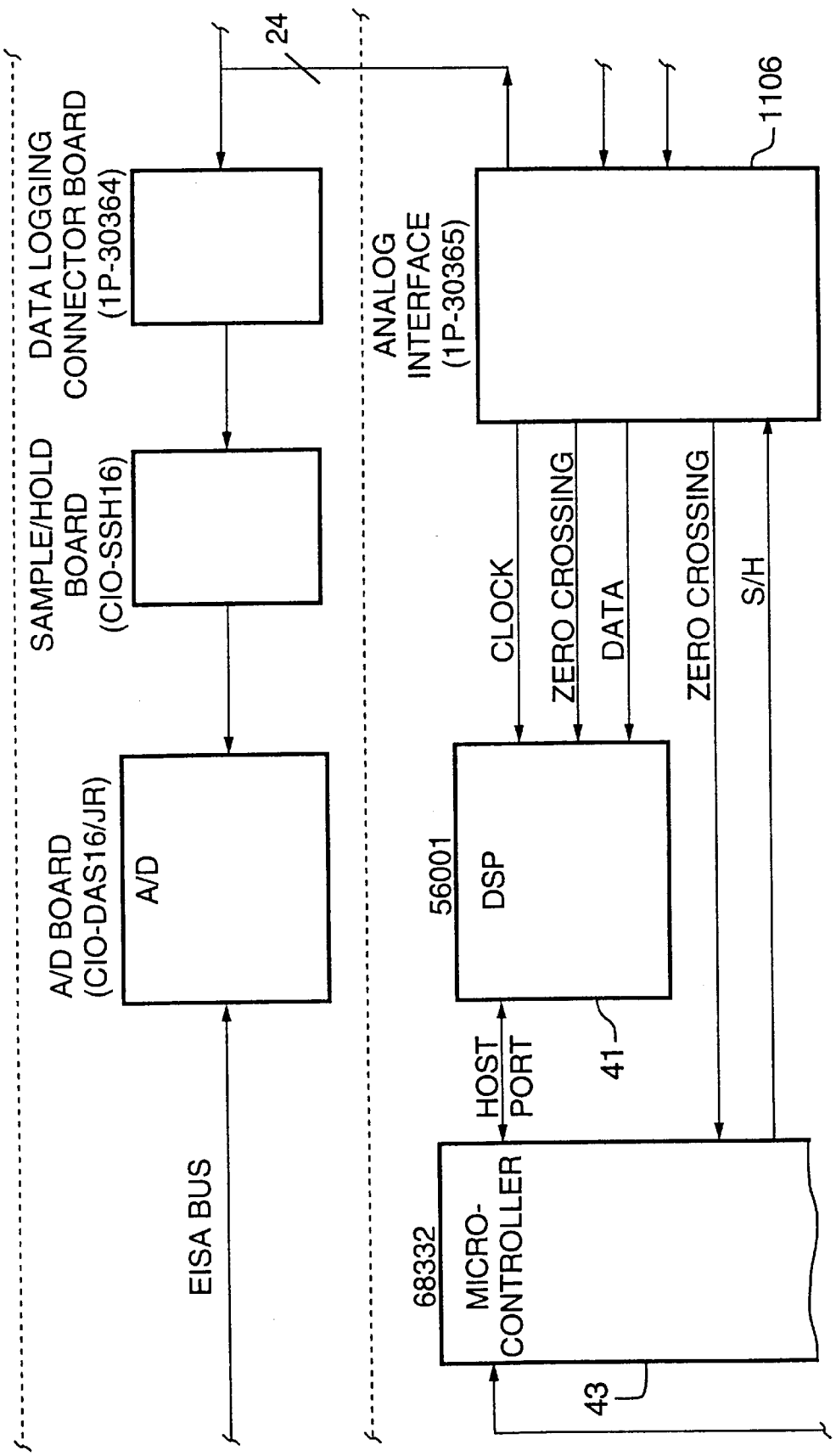
Figure 11D:
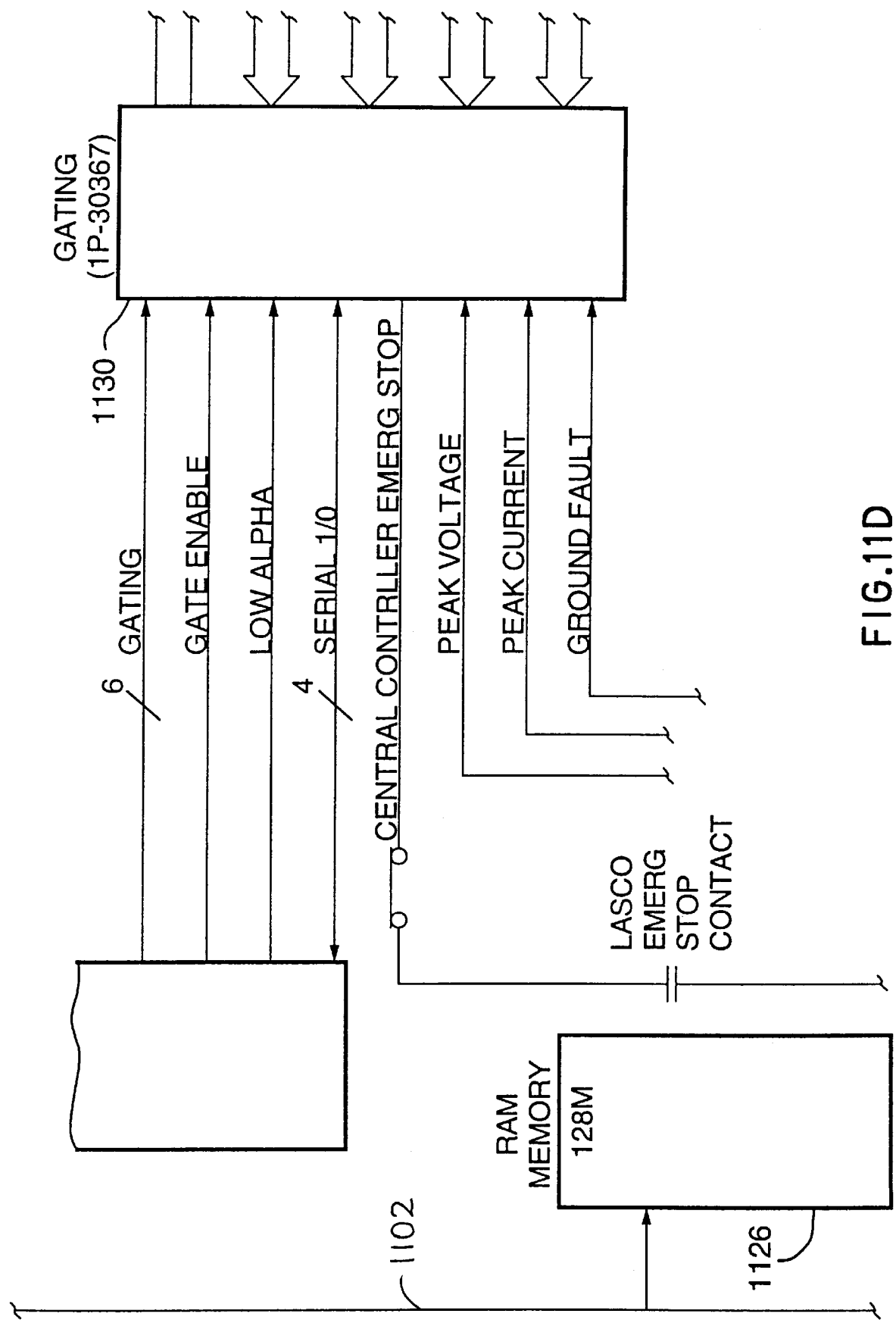
Figure 11E:
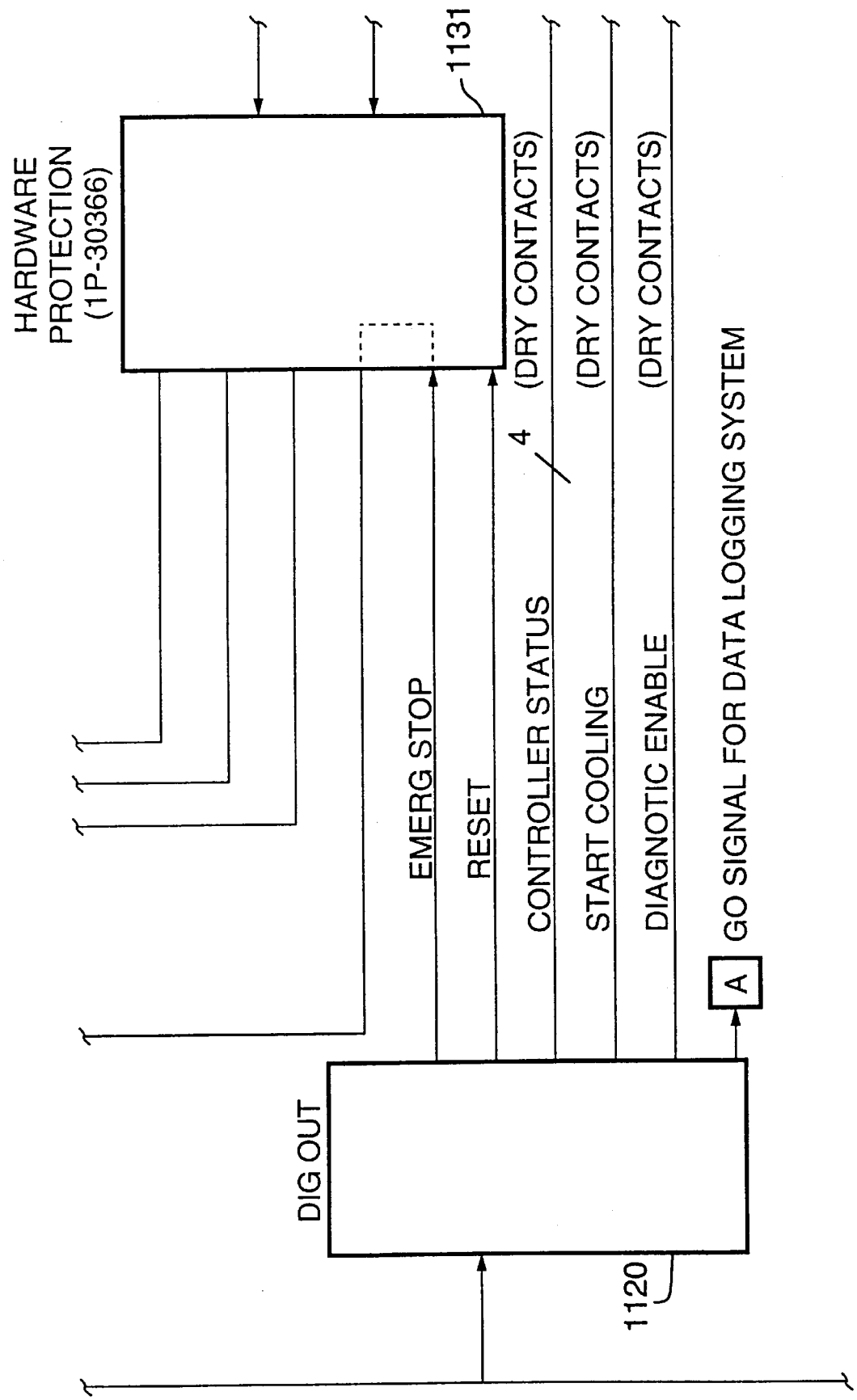
Figure 11F:
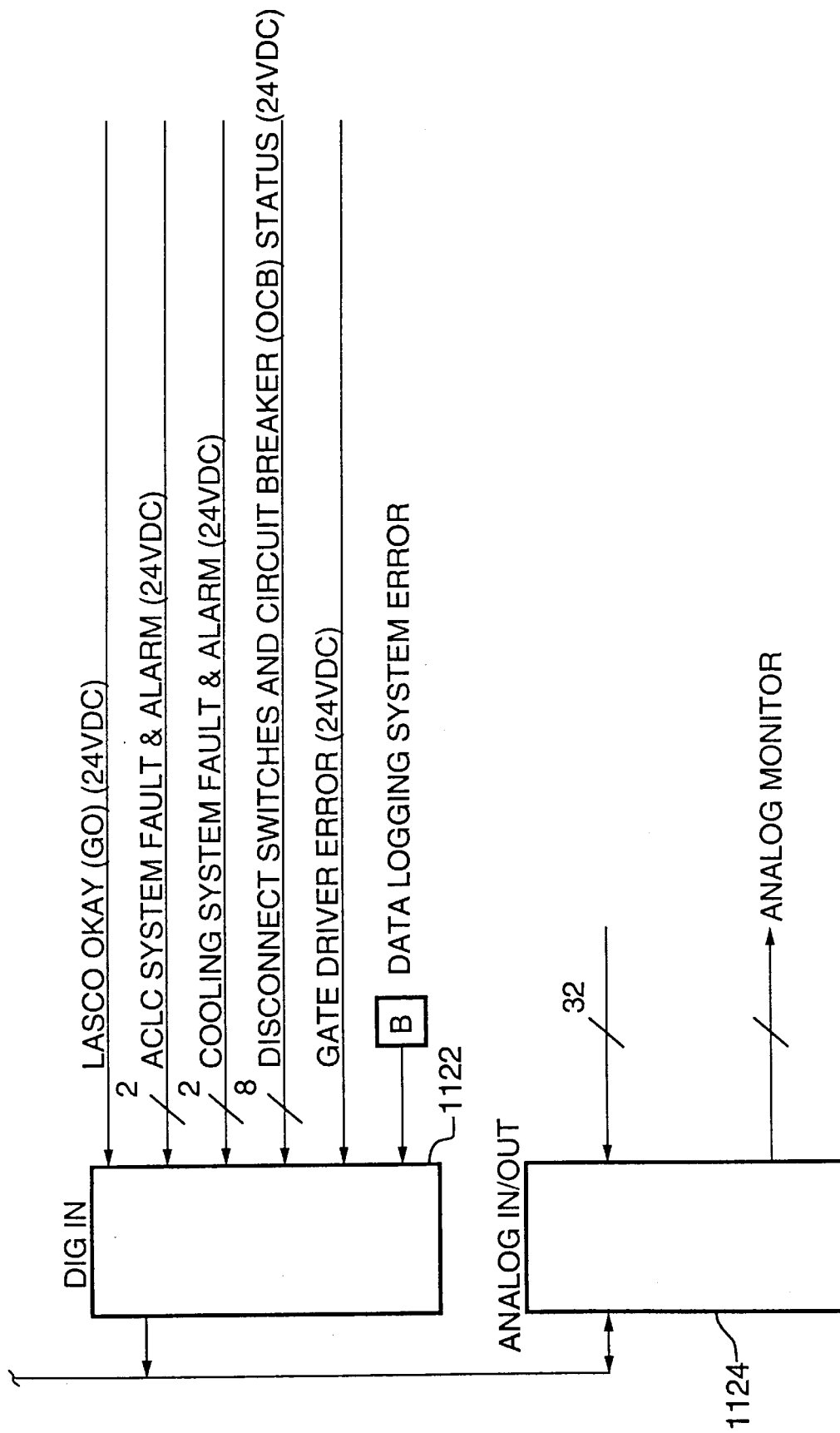
Figure 11G:
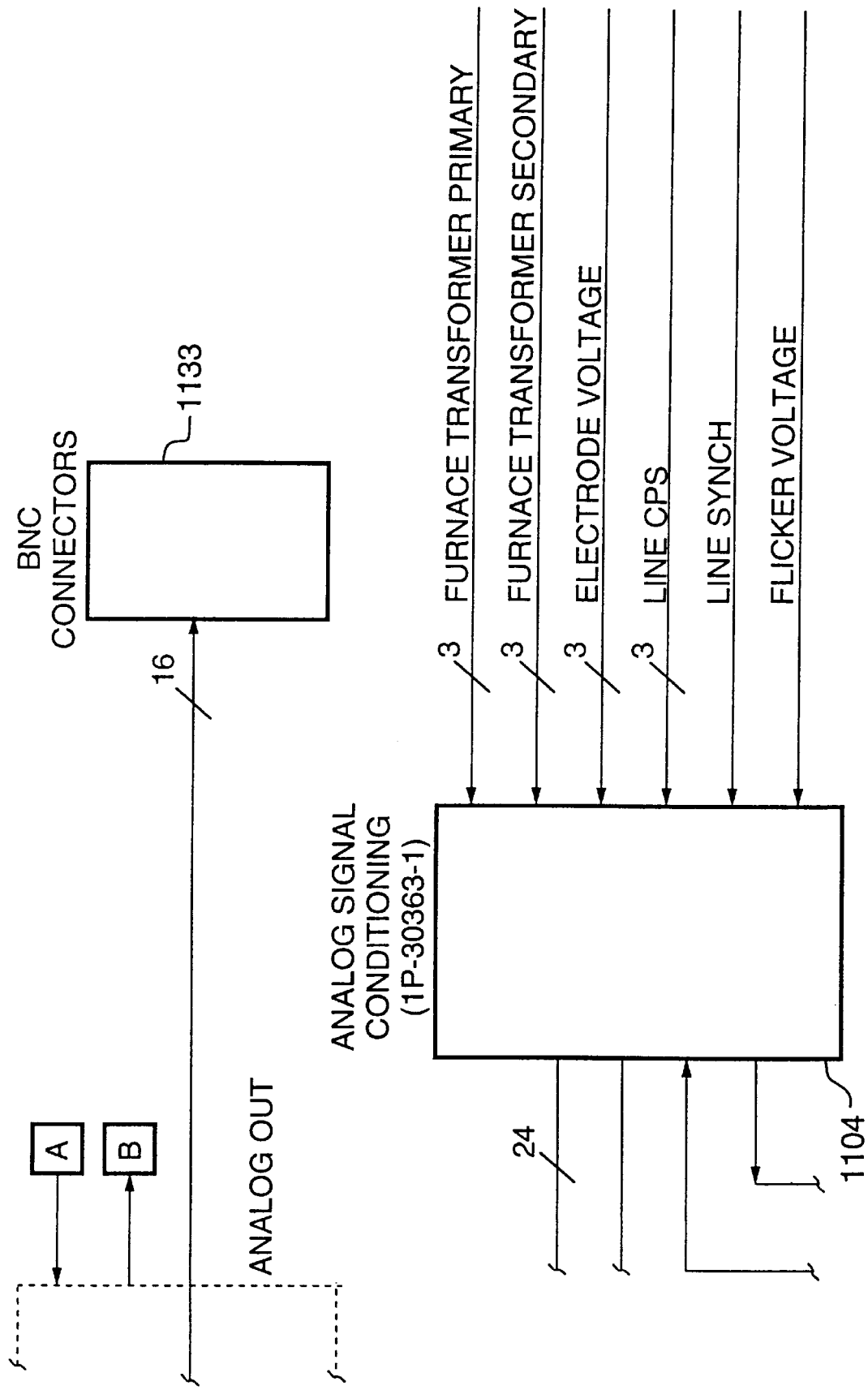
Figure 11I:
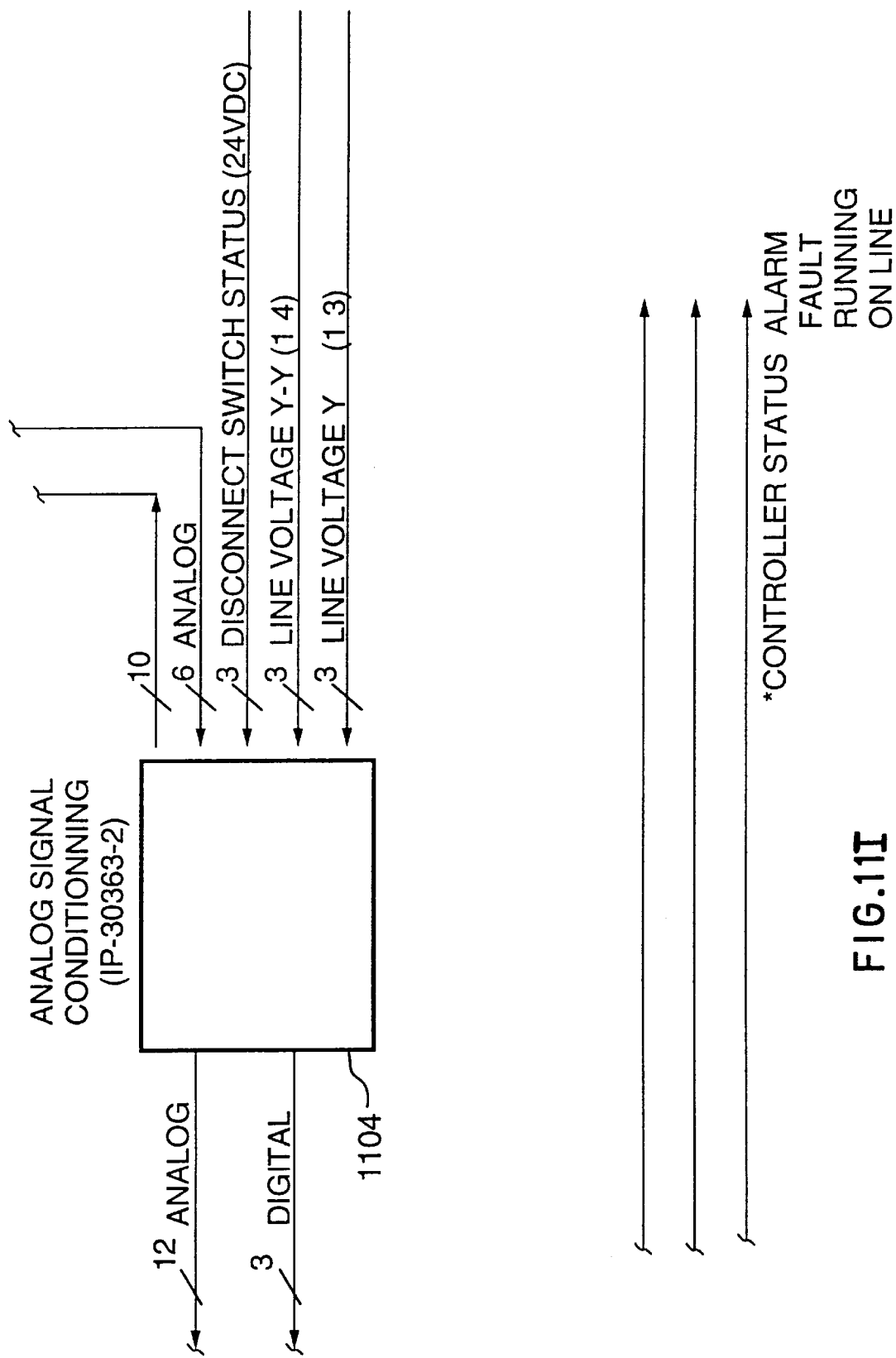

The status of the disconnect switches shown in FIG. 1 are monitored, as shown in FIGS. 9B and 11I. In particular, switches 4,6 and 10 are used to determine which transformer (9A or 9B) is supplying power to the furnace.

k) Lightning Arrestor Status

If any of the arrestors 20, 22 or 24 are conducting or about to conduct the firing signals have to be disabled, three CT's are used to measure the arrestor currents and a local hard-wired protection circuit sends a disable signal to the AC line controller. A status signal is sent to the central controller 900 for diagnostics. Details of the central controller are provided in FIG. 11. The arrestor fault signal passes through gating circuit 1130 and serial I/O to the microcontroller 43.

Having thus described the operation and construction of the system according to the present invention, a brief description of the best mode implementation is provided below, with reference to FIGS. 9–16.

A basic block diagram of the control circuit according to the present invention is shown in FIG. 9. The basic operating principles of the central control circuit are discussed briefly below. Thereafter, different sections of the control circuit hardware are identified and briefly described.

Central controller circuit 900 performs the following functions sequentially, to regulate line currents in the electric arc furnace:

1. I/O interface
2. Digital signal processing
3. Prediction of arc furnace model
4. Limit conditions and diagnostics
5. Generation of gating signals
6. Fibre optic transmitting and receiving The I/O interface functionality is provided by the central controller 900 for effecting orderly start-up/shut-down sequences, on-line prediction of the arc furnace model, diagnostics and protection, monitoring the linearity of the furnace transformer 39 and synchronization of the ACLC 903.

The digital signal processing functionality of the ACLC 903 is used for effecting discrete Fourier analysis on selected input signals, as described in greater detail above, to determine the arc furnace model parameters. From this information, the power factor and active and reactive power input to the furnace are also calculated.

The arc furnace parameters as predicted by the digital signal processing function, are used to access the delay angles required for regulating the arc furnace line currents. These delay angles are precalculated and stored in a look-up table, as described above. The delay angles are used in the microcontroller 43 of ACLC 903 for generating real time gating patterns for the AC thyristors Q1–Q6.

Limit conditions and diagnostics are then checked for any necessary over-ride of the calculated delay angles, as discussed above.

Figure 14:
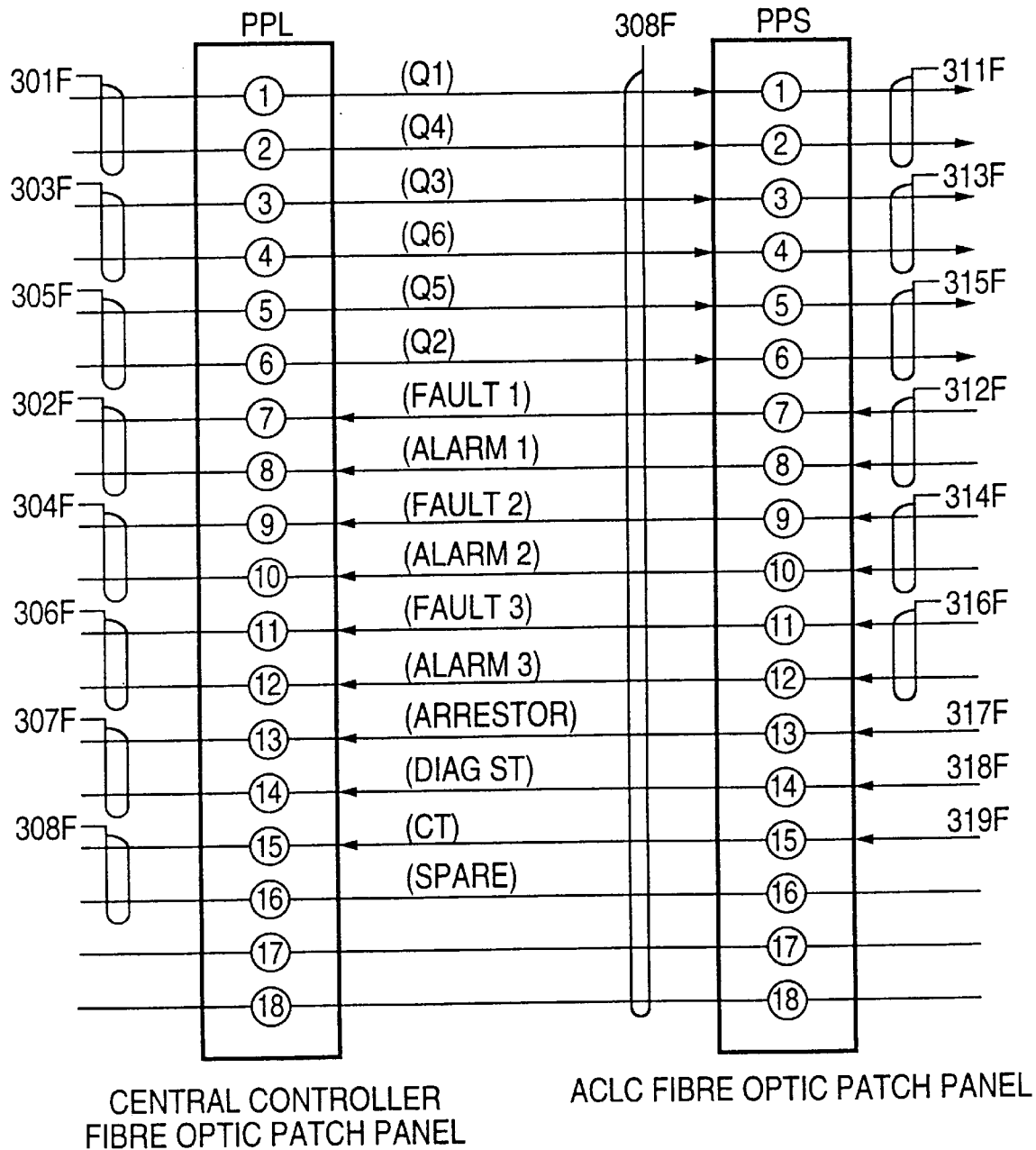
FIG. 14 shows an AC line controller and central controller fibre optic patch panel for the predictive line controller according to the preferred embodiment.
Figure 15:
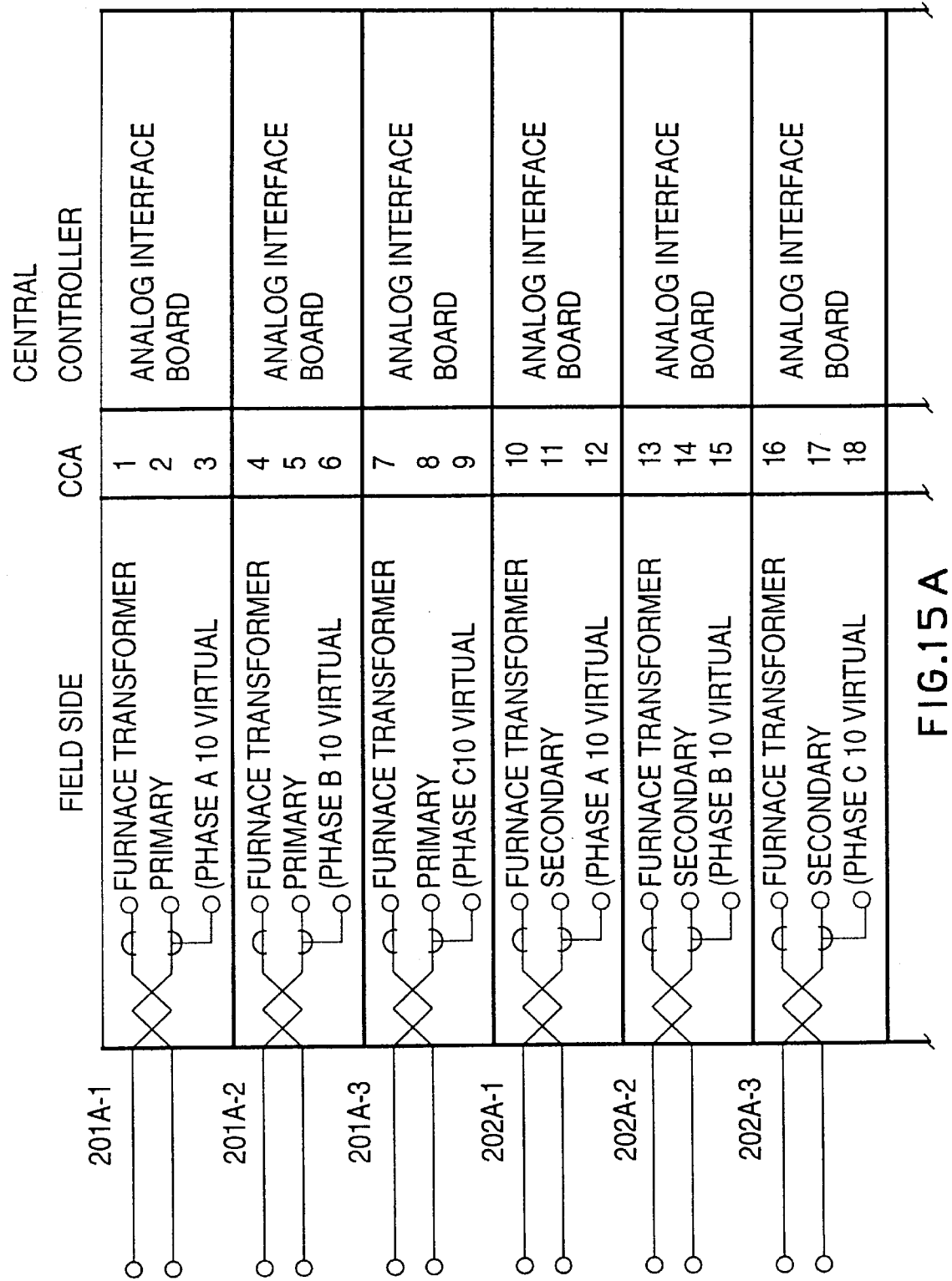
FIG. 15 comprising parts 15A–15D, shows a central controller analog signal terminal block for the line controller according to the preferred embodiment.
Figure 15B:
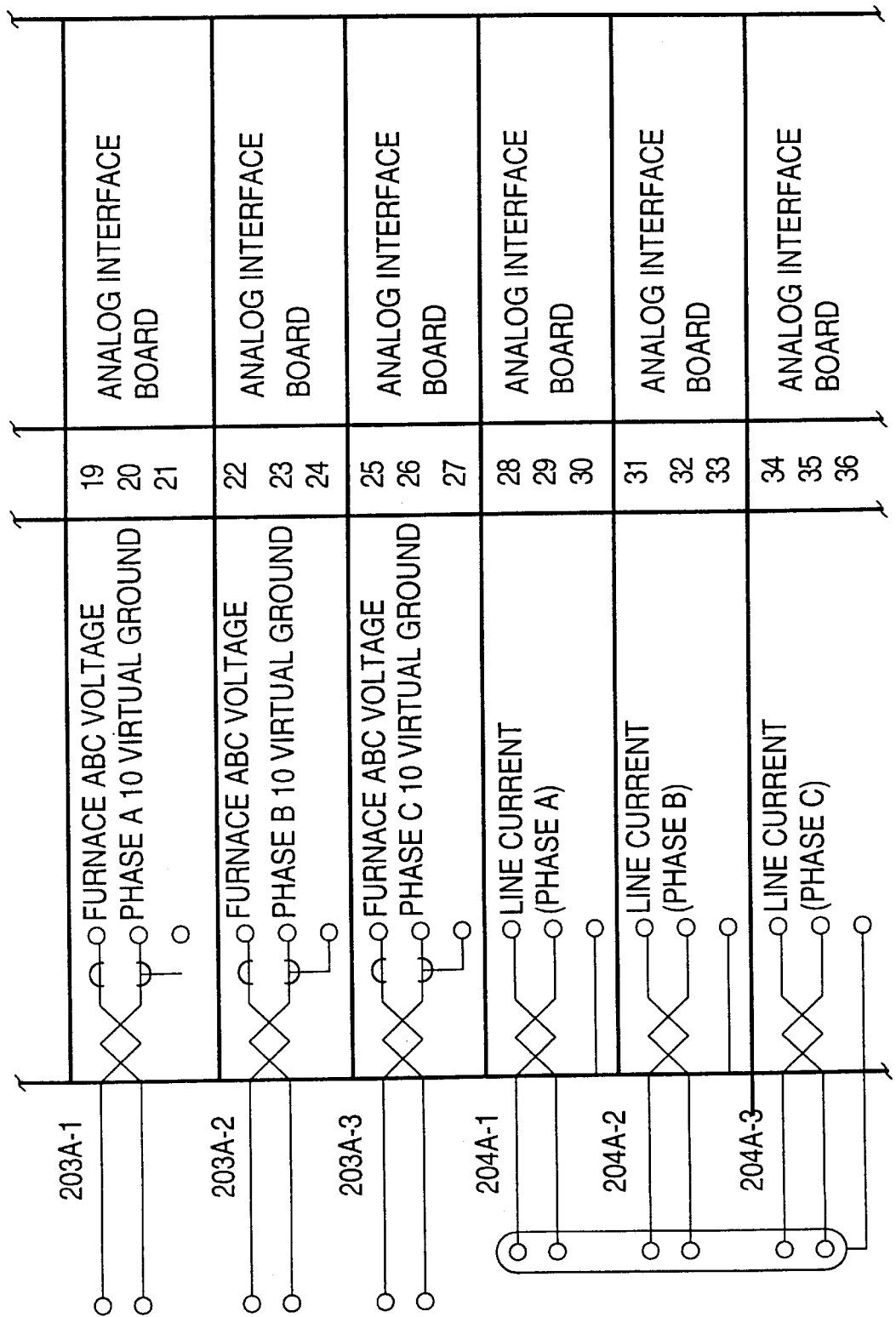
Figure 15C:
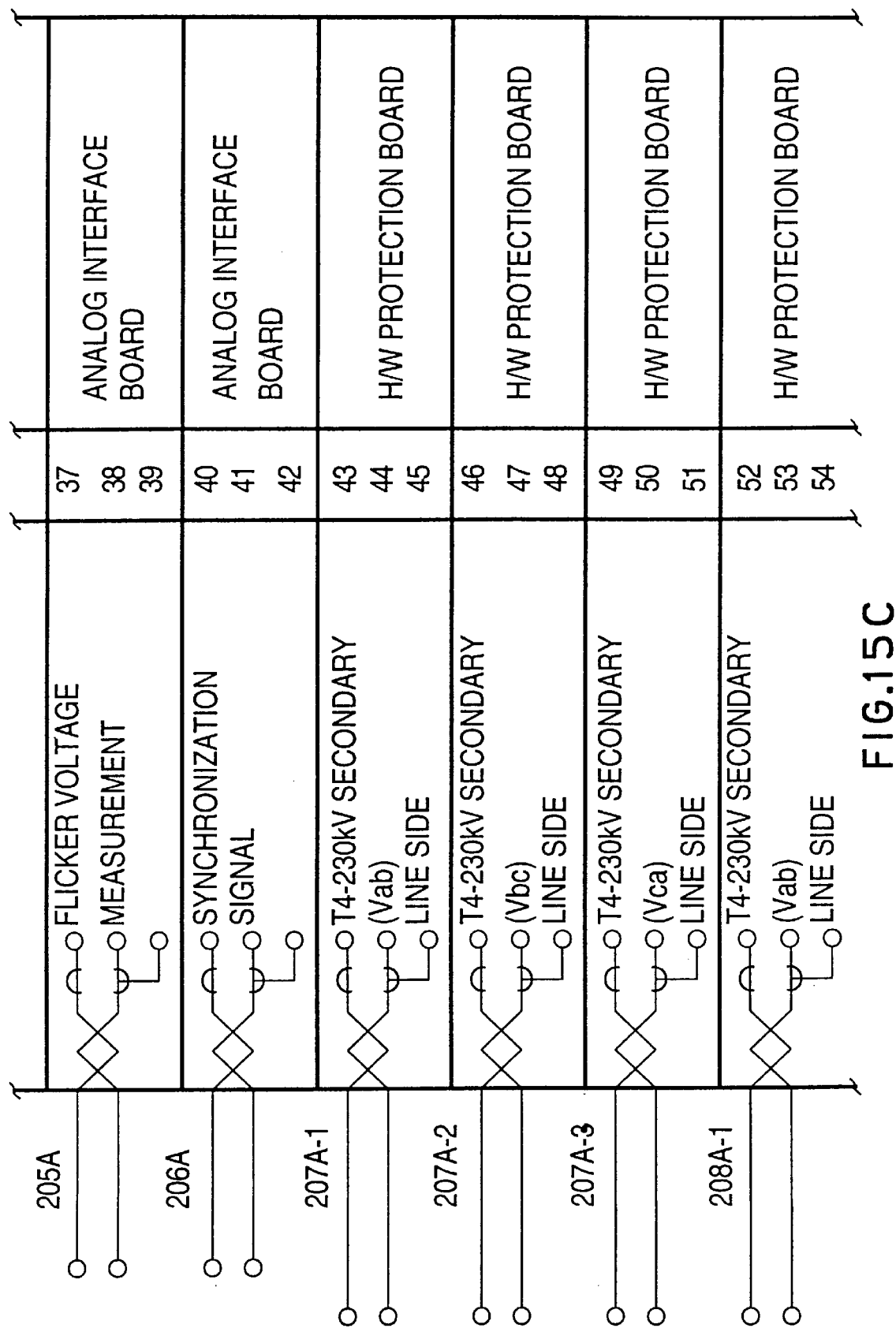
Figure 15D:
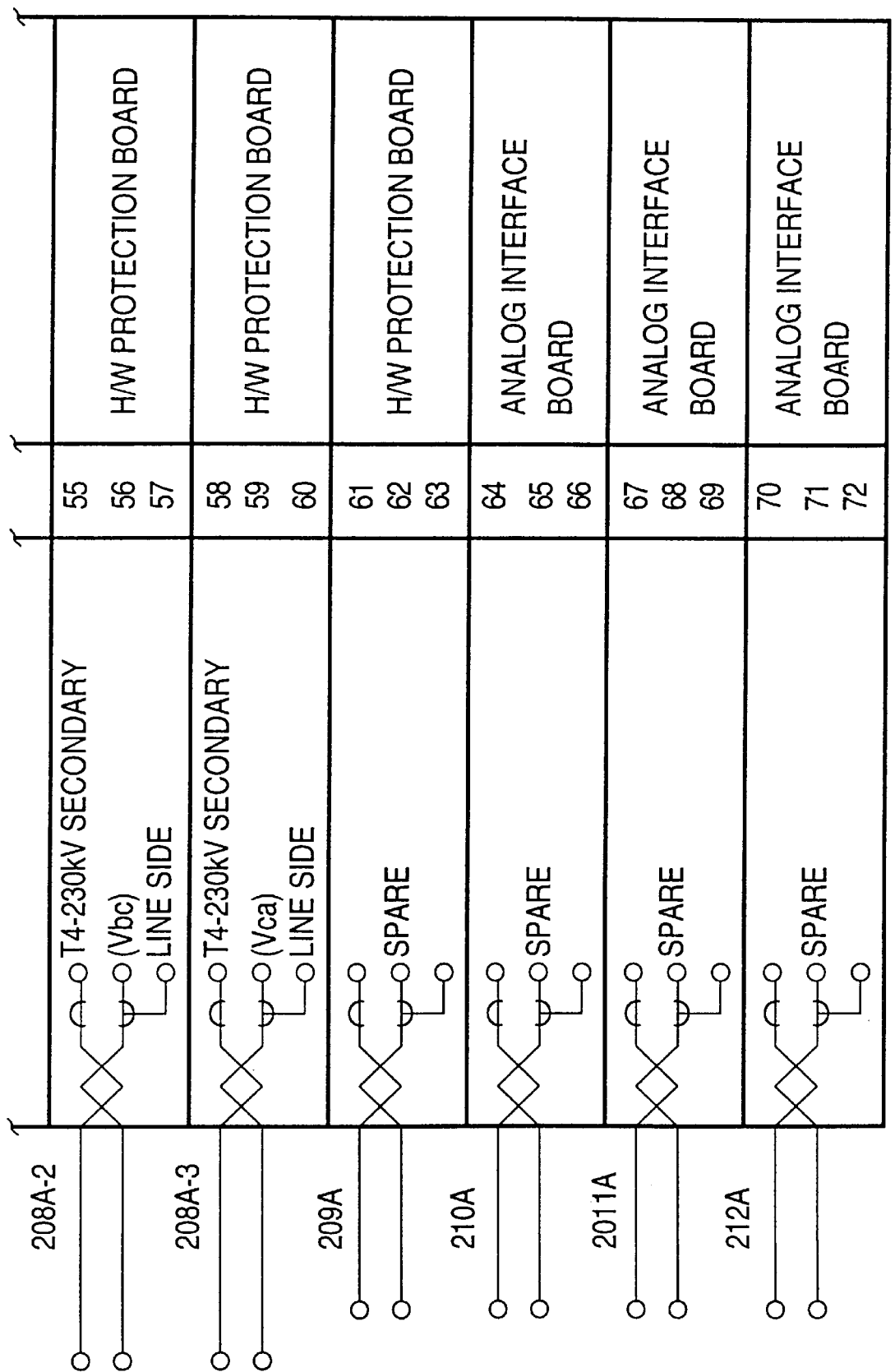

The fibre optic gating interface board 902 is used to transfer SCR gating signals from a computer room to the thyristors Q1–Q6 in an AC switch room, which can be up to 1200 feet apart. The fibre optic gating interface board 902 receives signals from the central controller via a fibre optic patch panel 904 (FIG. 14). The fibre optic gating interface board 902 comprises three transmitter/receiver circuits, a representative transmitter/receiver circuit being shown in FIG. 10 for generating appropriate gating signals to parallel connected thyristors Q1 and Q4 (the second and third transmitter/receiver circuit being identical for gating thyristors Q3, Q6 and Q5, Q2, respectively).

Arrestor fault detection and overcurrent detection circuits 906 and 908 are provided for effecting AC switch overcurrent and lightning arrestor detection as discussed above in connection with the diagnostics and protection function of the present invention.

Analog and control signal inputs to the central controller 900 are provided via a central controller analog terminal block 910 and a central controller control signal terminal block 912, respectively. The central controller analog signal terminal block 910 is connected to central controller 900 via an analog voltage isolation block 905, and is shown in greater detail with reference to FIG. 15. The central controller control signal terminal block 912 is shown in greater detail with reference to FIG. 16.

As indicated above, additional features of the control circuit are shown in greater detail with reference to FIGS. 11–13. The control hardware is based on a VME backplane 1102 (shown in detail with reference to FIG. 13). A 386 personal computer 1100 plugs directly into the VME backplane 1102. The 386 PC 1100 functions as a master controller. A second processor board is implemented under control of the MC68332 microprocessor 43, for generating the switch gating signals. The microcontroller 43 has a DSP 56001 daughter board housing the DSP 41, which processes the analog signals required for the control algorithms discussed above. Analog signals are initially received via an analog signal conditioning circuit 1104 and applied to the analog interface 1106 which contains A/D converters 47. The analog signal conditioning circuit 1104 and analog interface 1106 are shown in greater detail with reference to FIG. 12.

There are three VME I/O boards that are used for general system control and protection I/O, as discussed in greater detail below.

As indicated above, FIG. 13 shows the placement of slots for the VME backplane 1102. The VME backplane 1102 comprises two boards. One board is used for connectors (this board having twenty slots of standard VME P1 connectors). The second board is a custom board for P2 connectors. This board has 18 slots, six of the slots being VSB/extended VME slots and twelve slots being unconnected. These additional twelve slots are used for I/O boards that receive external signals through the backplane.

The 386 PC 1100 provides operator interface, system control and debugging. This PC is configured in a standard manner, with VGA controller 1108, keyboard input 1110, serial port 1116 and printer 1118. Through the VGA monitor 1108 and keyboard 1110, the operation state of the system can be observed and modified by an operator. Status and protection signals are coupled into the PC 1100 through the VME I/O boards 1120, 1122 and 1124. Processed data signals (e.g. arc voltages and current), are communicated to the PC 1100 over the VME backplane 1102 by the microcontroller 43. The alpha look-up table is stored on the hard drive 1112 and PC 1100 loads this table into RAM memory 1126 on power up. Thus, the microcontroller 43 can directly access this RAM based look-up table through the VME bus 1102.

There are five general purpose I/O boards connected to the VME backplane 1102, including the MC68332 I/O ports which are used under software control. These boards handle the system control and status I/O and all of the relatively slow diagnostic/protection signals (i.e. protection signals of duration longer than 10 milliseconds). As discussed briefly above, signal conditioning board 1104 conditions the analog signals before being applied to the I/O boards.

The hardware protection board 1131 provides the following hard wired protections for ACLC:

excessive peak voltage across any switch stack, excessive peak current through AC switches 19, ground fault.

For peak voltage protection, first, the per phase voltage across each switch stack is calculated by subtracting the anode voltage (VPA, VPB, VPC) from the cathode voltage (VK1, VK2, VK3). Then, these differences are compared with a preset limit which can be controlled by an adjustable potentiometer P2.

For peak current protection, the line currents are compared with a preset limit which can be controlled by a further adjustable potentiometer P1.

The ground fault signal is generated by comparing the sum,of the three phase line currents (IAL, IBL, ICL) with a preset limit which can be controlled by an additional adjustable potentiometer P3.

All of these comparisons are effected using analog op-amps (U8, U9, U11, U12) R-S latches (U14, U16) are employed to wave shape the comparator output signals into digital signals Vpeak, Ipeak, and GNDFLT. These signals are sent to the gating Fibre Optic Board 1130 where they are used (together with other diagnostic signals) to determine whether to turn on or to turn off the gating signals.

Since these output signals are generated through hard-wired circuits, protective action can be taken quickly.

The hardware protection board 1131 also receives two digital signals RST and EMST from the Digital Output Board 1120. The reset signal RST overwrites all of the comparator outputs and resets the Vpeak and Ipeak, and GNDFLT signals to low logic levels. The emergency stop signal EMST passes through this board to the gating fibre optic board 1130.

As discussed in greater detail above, and as shown in FIGS. 11C and 11D, the microcontroller 43 and DSP 41 are connected to the VME bus 1102. The microcontroller 43 performs real time control and generates the required switch gating signals, while the DSP 41 pre-processes the analog feedback signals. Every 500 microseconds, DSP 41 generates new data to the microcontroller 43. Microcontroller 43 uses this information to obtain the required delay angles from the look-up table stored in RAM memory 1126 and thereby updates the switch gating patterns via gating circuit 1130. Although the preferred embodiment utilizes a separate memory board 1126 for storing the look-up table, microcontroller 43 (MC68332) incorporates a 2MB dual ported DRAM which can accommodate small look-up tables.

Figure 12A:
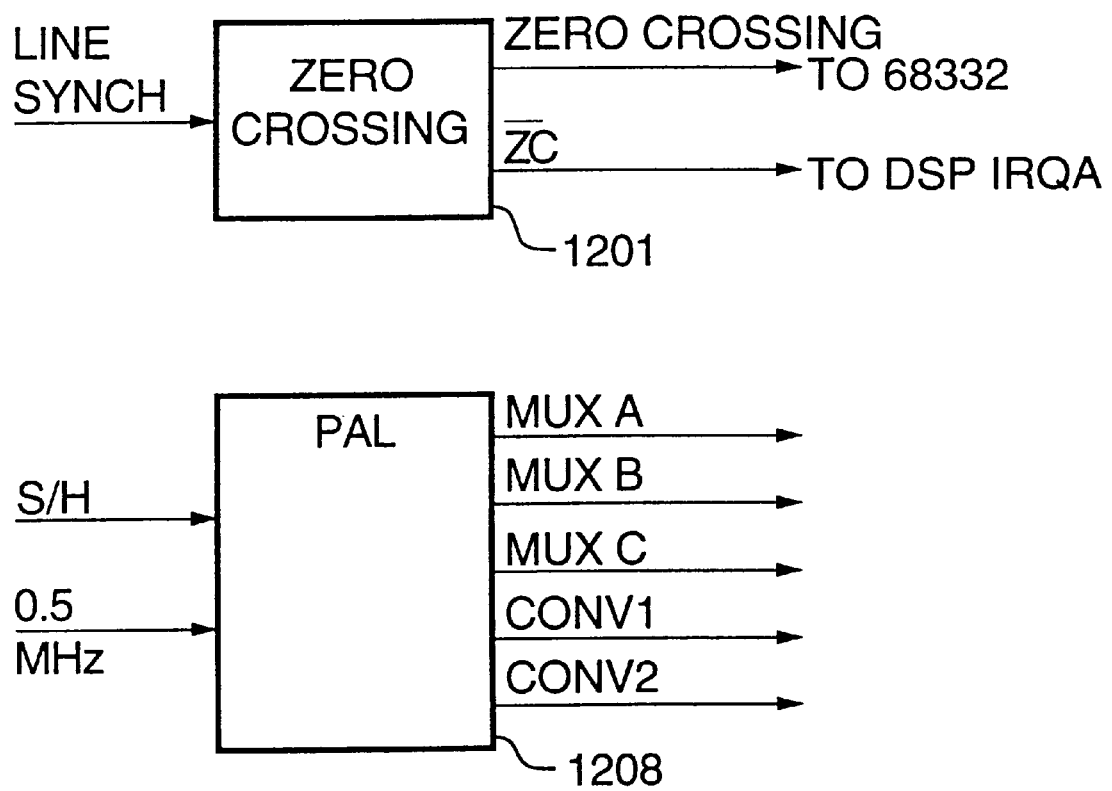
FIG. 12, comprising parts 12A–12E, is an analog interface block diagram according to the preferred embodiment.
Figure 12B:
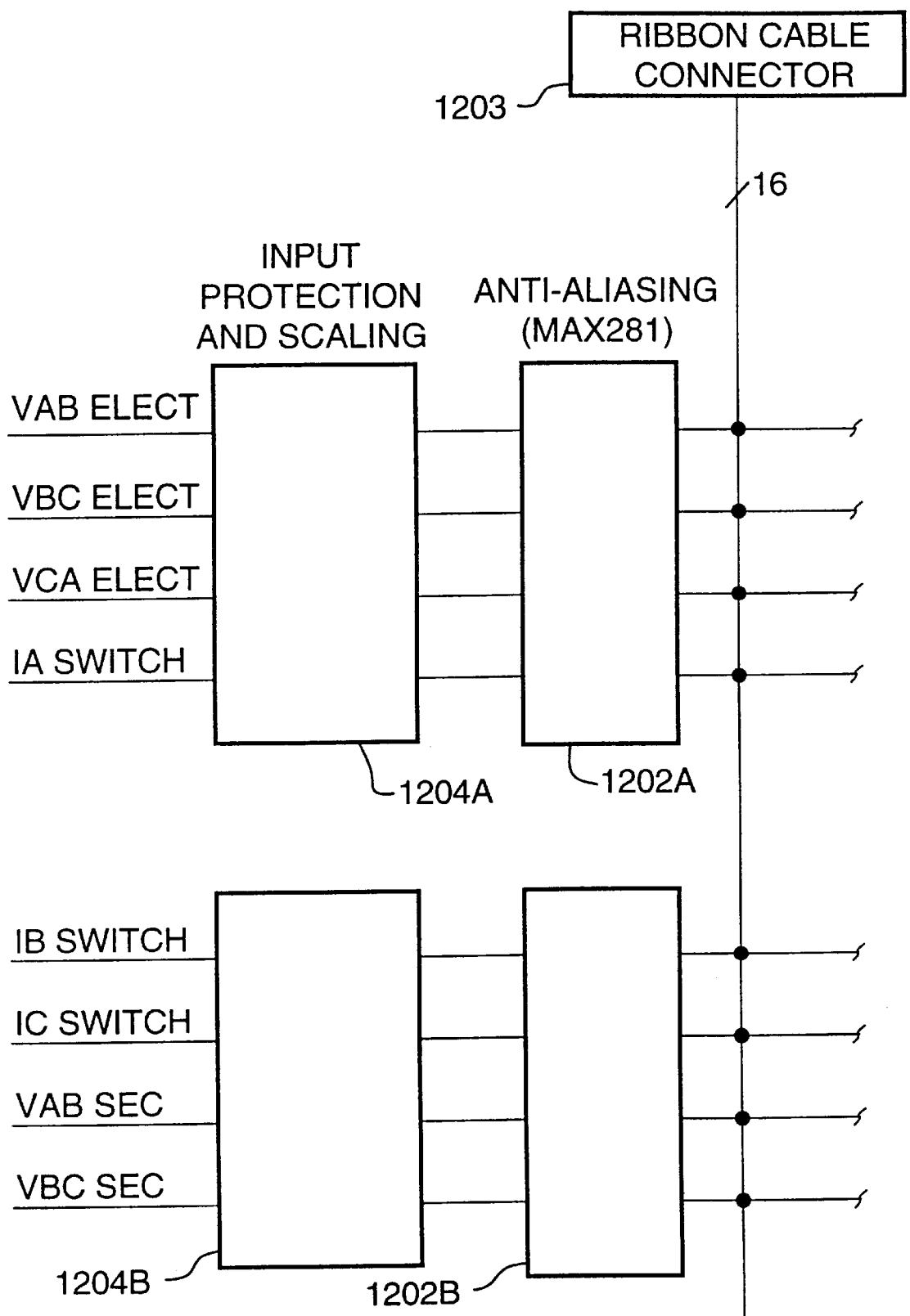
Figure 12C:
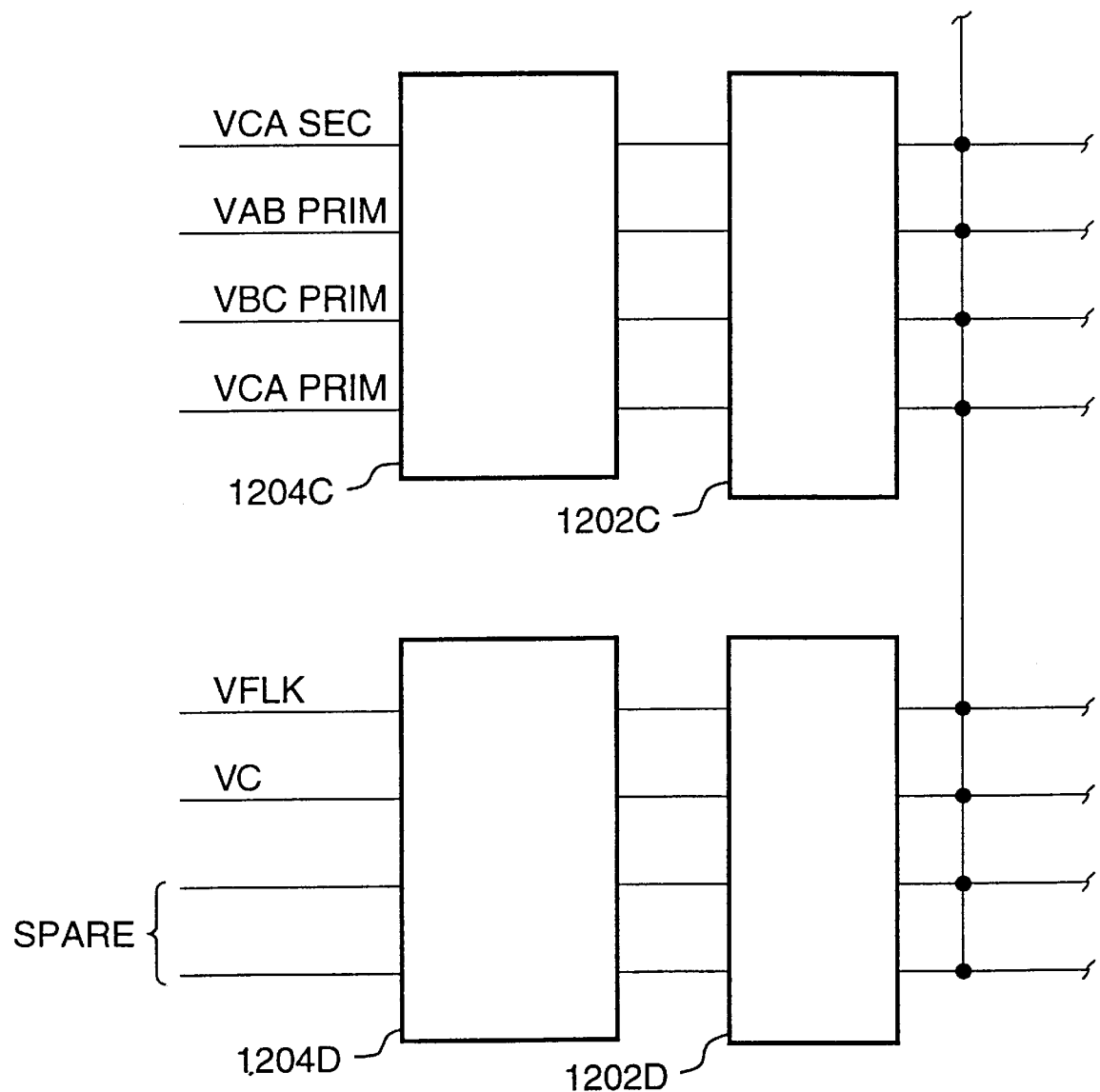
Figure 12D:
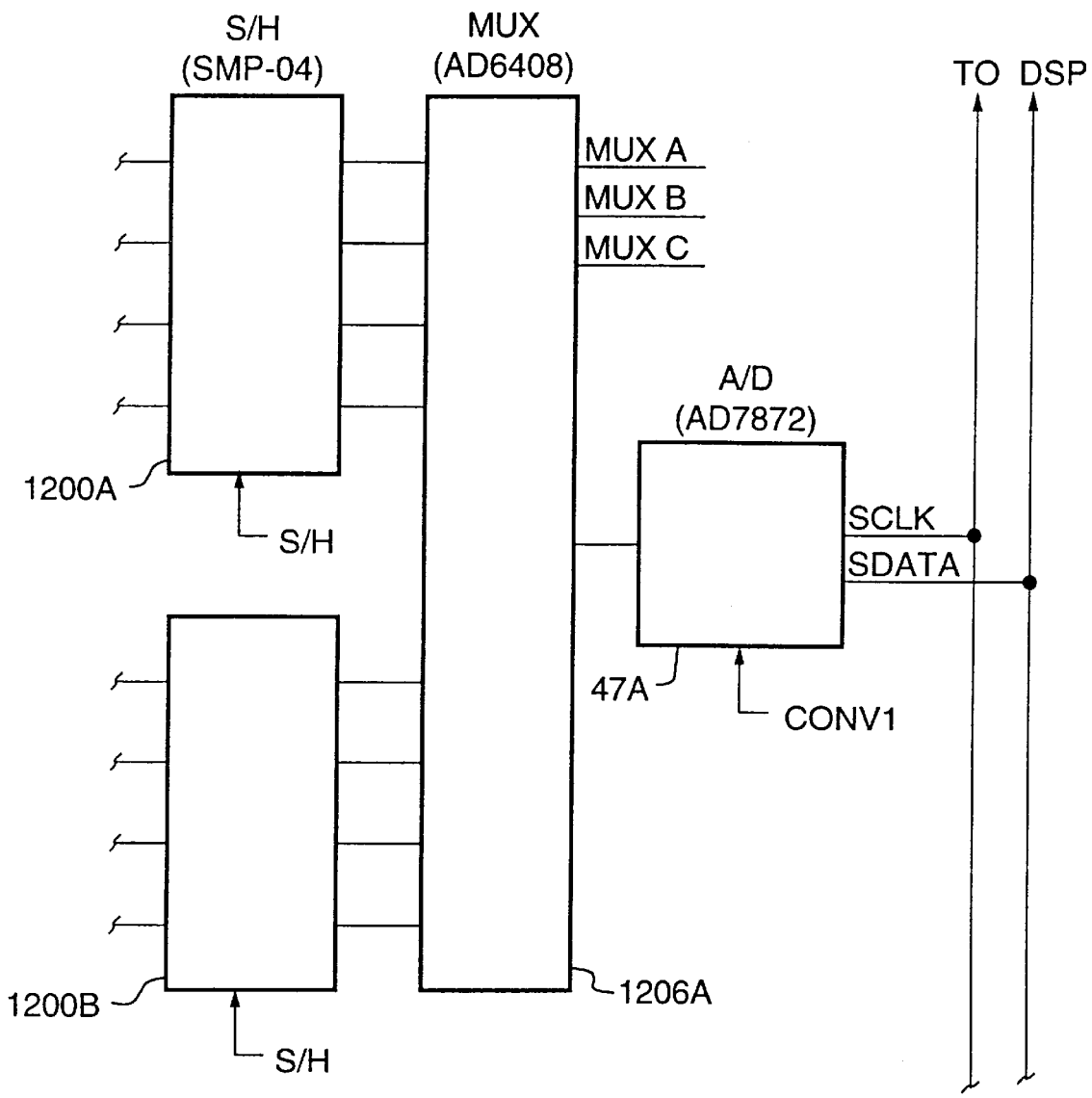
Figure 12E:
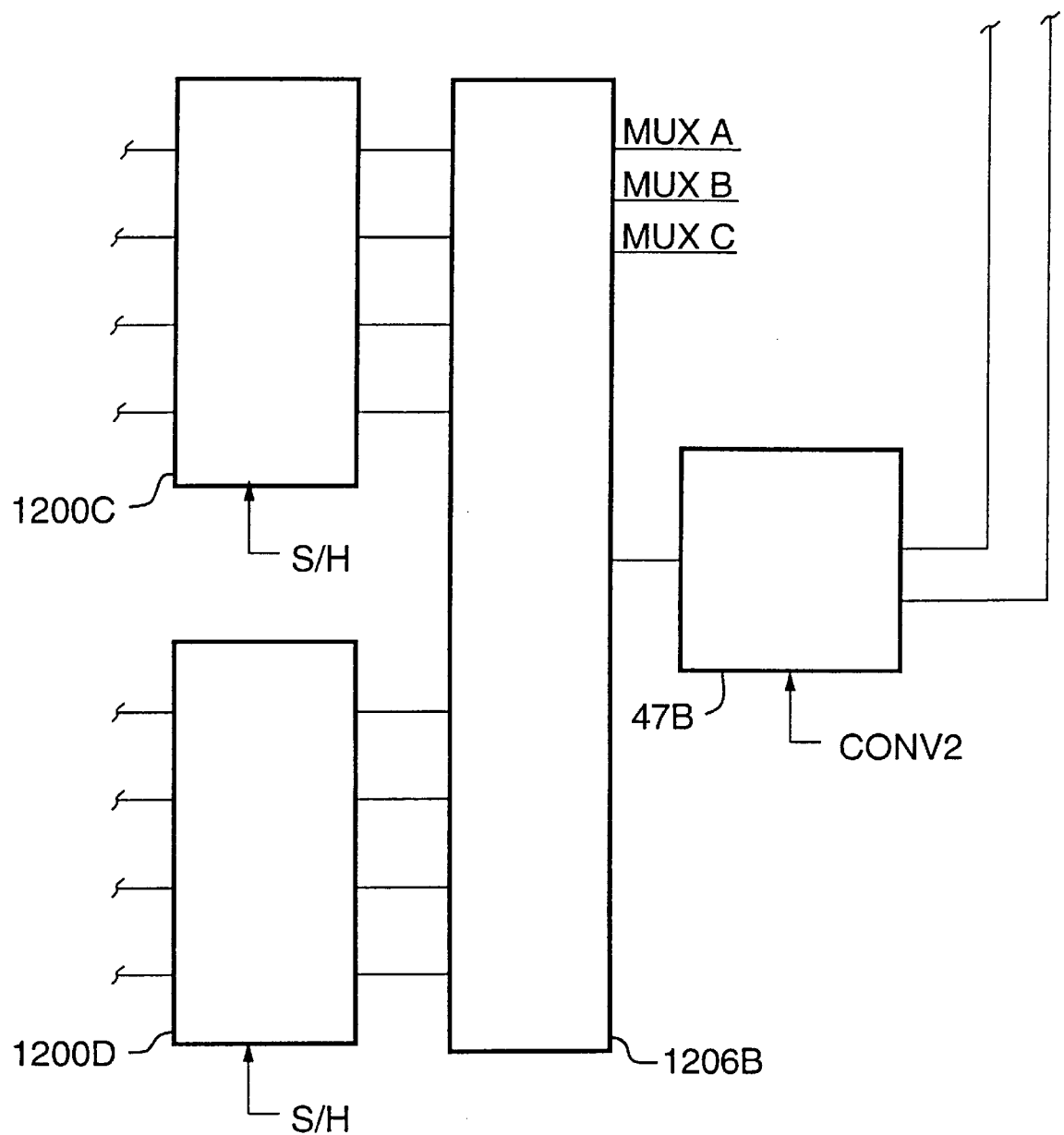

Turning again to FIG. 12, the structure of analog interface 1106 and analog signal conditioning unit 1104 is illustrated. Seventeen analog input signals are received by the analog signal conditioning board 1104, 16 of which are measurement channels and one which provides the synchronization signal (primary 230 kV voltage). The synchronization signal is filtered and transmitted directly to the microcontroller 43 via zero crossing circuit 1201 (FIG. 12A). Microcontroller 43 measures the line frequency and returns the signal exactly 1/32 of the line frequency, as discussed in greater detail above with reference to FIGS. 5–7. As indicated above, the synchronization signal controls the timing of data collection. The analog board 1104 has 16 sample and circuits 1200A–1200D (FIGS. 12D, 12E) to ensure that there is no skew in the channels. Each measured channel has an anti-aliasing filter 1202A–1202D for implementing a fifth order Bessel low pass filter with a filter cut off frequency of 300 Hertz. Sample and hold circuits 1200A–1200D are connected to filters 1202A–1202D via ribbon cable connector 1203 (FIGS. 12A, 12B).

A/D converter 47 is implemented as two 14-bit serial A/D converters 47A and 47D. Each A/D converter has an external 8 channel multiplexer (1206A and 1206B) (FIGS. 12D, 12E) which forces sequential scanning of the channels. Line selection control signals for multiplexers 1206A and 1206B are generated via a programmable array logic (PAL) 1208 (FIG. 12A). Each of the multiplexers requires 14 microseconds for conversion, for a total conversion time of 224 microseconds. As each channel is being converted, the results are sent to the DSP 41. The DSP 41 performs ongoing calculations in parallel with the A/D conversions so that the calculation updating is completed within 14 microseconds after the last channel has finished conversion.

The gating interface board 1130 (FIG. 11D) receives the logic level gating signals from the microcontroller 43 and drives the six fibre optic gating lines via the ACLC and central controller fibre optic patch panel shown in FIG. 14.

A data logging system 1132 (FIG. 11A) is provided in rack mount format including a 486-type computer with a hard disk (520 MB) for data logging and a separate A/D board for data acquisition, to satisfy the high speed data logging requirements of monitoring 16 channels. Input/output to the data logging system is provided by means of BNC connectors 1133 (FIG. 11G). During a complete heat cycle, all of the 16 analog signals can be digitally stored on the hard disk which can be used later for any data logging purposes. This storage data also provides an effective tool for analysing the cause of any problems prior to a fault signal.

A removable hard disk with 270 MB is provided for the data logging system to allow very fast back-up of the heat cycles during 5–10 minute time available between consecutive heat cycles of the arc furnace.

A person skilled in the art may conceive of other variations and alternative embodiments, all of which are believed to be within the sphere and scope of the invention as defined by the claims appended hereto.

I claim:

1. In an electric arc furnace having a power source for applying at least one voltage to at least one electrode, said electrode being spaced apart from a grounded container for receiving metal, wherein the application of said voltage to said electrode causes generation of an electrical arc between said electrode and said container for melting said metal, a predictive line current controller comprising:

a) a plurality of switches intermediate said power source and said electrode; and b) a central controller for monitoring said voltage and generating a system model thereof, and in response generating and applying a plurality of gating signals to said plurality of switches, said gating signals being delayed by respective predetermined amounts based on said model, for causing said plurality of switches to gate said voltage in accordance with said model so as to reduce flicker in said electric arc furnace, wherein said central controller comprises:

i) a signal processor for performing a frequency domain analysis on said voltage; and ii) a microcontroller coupled to said signal processor for generating said gating signals from said analysis.

2. The predictive line controller of claim 1, wherein said central controller further comprises:

iii) an analog-to-digital converter for digitizing said voltage, and wherein said signal processor comprises a digital signal processor coupled to said analog-to-digital converter for performing a running discrete Fourier series on the digitized voltage for generating a direct current component, a real component and an imaginary component thereof, and generating index values based on said direct current component, real component and imaginary component, and said microcontroller generates said gating signals in response to said index values.

3. The predictive line controller of claim 2, wherein said digital signal processor further comprises a digital filter for performing said running discrete Fourier series and an index calculator for generating said index values.

4. The predictive line controller of claim 2, wherein said microcontroller further comprises a memory for storing delay angle values for delaying said gating signals by said respective predetermined amounts, said delay angle values being addressed in said memory by said index values.

5. The predictive line controller of claim 1, wherein said plurality of switches comprises a plurality of thyristors.

6. The predictive line controller of claim 5, wherein said plurality of tyristors are arranged in opposite polarity pairs with each of said pairs corresponding to one of three phases of said voltage.

7. An electric arc furnace, comprising:
   a) a three phase power source;
   b) three opposite polarity pairs of thyristors connected to respective phases of said three phase power source;
   c) a furnace transformer having primary windings and secondary windings, said primary windings being connected to said three opposite polarity pairs of thyristors;
   d) three electrodes being connected to said secondary windings;
   e) a grounded container for receiving metal, said electrodes being disposed within said container and spaced apart therefrom, whereby application of power from said power source to said electrodes causes generation of respective electrical arcs between each of said electrodes and said container for melting said metal; and
   f) a predictive line controller for monitoring predetermined line currents and voltages on opposite sides of said furnace transformer and in response generating predetermined gating signals for firing respective ones of said thyristors at predetermined times so as to reduce flicker in said electric arc furnace,
   wherein said predictive line controller comprises:
      i) a signal processor for performing a frequency domain analysis on said line currents and said voltages; and
      ii) a microcontroller coupled to said signal processor for generating said gating signals from said analysis.

8. The electric arc furnace of claim 7, wherein said predetermined line currents and voltages include line-to-virtual ground voltages at each of said three electrodes, line currents flowing through each of said primary windings, line-to-line voltages across said three primary windings and line-to-virtual ground voltages at each of said secondary windings.

9. The electric arc furnace of claim 8, wherein said predictive line controller further monitors one of said primary line-to-line voltages for synchronization of said controller.

10. The electric arc furnace of claim 7, wherein said predictive line controller further comprises:
   iii) an analog-to-digital converter for digitizing said line currents and said voltages,
and wherein said signal processor comprises a digital signal processor coupled to said analog-to-digital converter for performing a running discrete Fourier series on the digitized line currents and voltages for generating direct current components, real components and imaginary components thereof, and generating index values based on said direct current components, real components and imaginary components, and said microcontroller determines corresponding delay angles based on said index values and generates said gating signals with said delay angles.

11. In an electric arc furnace having a power source for applying three phase power to three respective electrodes, said electrodes being spaced apart from a grounded container for receiving metal, and wherein the application of said power to said electrodes causes generation of electrical arcs between said electrodes and said container for melting said metal, a method of firing a plurality of switches connected intermediate respective phases of said power source and said three electrodes comprising the steps of:
   a) calculating the period of one line-to-line voltage generated by said power source;
   b) generating a plurality of sampling points from said period;
   c) for each one of said sampling points simultaneously sampling and holding predetermined line currents and voltages intermediate said switches and said electrodes;
   d) successively converting the sampled line currents and voltages to digital values;
   e) for each of said line voltages converted to digital values calculating two line-to-line digital voltage values;
   f) performing a running discrete Fourier series on each of said line current and digital values for generating a frequency model of said arc furnace;
   g) calculating a plurality of index values based on said model;
   h) for each of said index values forming a base address;
   i) accessing predetermined memory locations of a look-up table using each said base address and retrieving from said memory locations respective delay angle values;
   j) generating respective gating signals based on said delay angle values; and
   k) applying said gating signals to said switches for firing said switches according to said delay angles, thereby applying said power to said electrodes in such a manner as to reduce flicker in said electric arc furnace.

12. A predictive line current controller for an electric arc furnace, the arc furnace including a container for receiving metal, an electrode spaced apart from the container, and an electrical power source coupled to the electrode and the container and having a voltage for generating an electrical discharge between the electrode and the container, the predictive line current controller comprising:
   a switch electrically connected between the power source and the electrode and including a gating input for connecting and disconnecting the electrode to and from the power source; and
   a central controller coupled to the power source for monitoring the voltage and generating a system model thereof, the central controller applying to the gating input a gating signal delayed by an amount derived from the system model for reducing flicker in the arc furnace.

13. The predictive line controller of claim 12, wherein said central controller comprises:
   i) a signal processor for performing a frequency domain analysis on said voltage; and
   ii) a microcontroller coupled to said signal processor for generating said gating signals from said analysis.

14. The predictive line controller of claim 13, wherein said central controller further comprises:
   iii) an analog-to-digital converter for digitizing said voltage, and wherein said signal processor comprises a digital signal processor coupled to said analog-to-digital converter for performing a running discrete Fourier series on the digitized voltage for generating a direct current component, a real component and an imaginary component of the digitized voltage, and generating index values based on said direct current component, real component and imaginary component, and said microcontroller generates said gating signals in response to said index values.

15. The predictive line controller of claim 14, wherein said digital signal processor further comprises a digital filter for performing said discrete Fourier series and an index calculator for generating said index values.

16. The predictive line controller of claim 13, wherein said microcontroller further comprises a memory for storing delay angle values for delaying said gating signals by said respective predetermined amounts, said delay angle values being addressed in said memory by said index values.

17. The predictive line controller of claim 12, wherein said switch comprises a pair of thyristors arranged in opposite polarity to each other.

18. The predictive line controller of claim 17, wherein said voltage includes three phases, and one of said thyristor pairs is coupled to each of said phases.

19. An electric arc furnace, comprising:
   a) a power source including three phases;
   b) a furnace transformer including three primary windings and three secondary windings;
   c) three switches, each said switch comprising a pair of thyristors arranged in opposite polarity to one another and being electrically connected to a respective one of said phases and a respective one of said primary windings and including a gating input for connecting and disconnecting a respective one phase to and from a respective one primary winding;
   d) three electrodes, each electrode being coupled to a respective one of said secondary windings;
   e) a container for receiving metal and being coupled to the power source, said electrodes being disposed within the container and spaced apart therefrom, whereby application of power from said power source to said electrodes causes generation of electrical arcs between each of said electrodes and said container; and
   f) a predictive line controller for monitoring alternating current signals on opposite sides of said furnace transformer and in response generating gating signals, said gating signals being delayed by predetermined times based on said alternating current signals, for firing respective ones of said thyristors at said predetermined times so as to reduce flicker in said electric arc furnace.

20. The electric arc furnace of claim 19, wherein said predictive line controller comprises:
   i) a signal processor for performing a frequency domain analysis on said alternating current signals; and
   ii) a microcontroller coupled to said signal processor for generating said gating signals from said analysis.

21. The electric arc furnace of claim 20, wherein said predictive line controller further comprises:
   iii) an analog-to-digital converter for digitizing said alternating current signals,
and wherein said signal processor comprises a digital signal processor coupled to said analog-to-digital converter for performing a running discrete Fourier series on the digitized signals for generating direct current components, real components and imaginary components of the digitized signals, and generating index values based on said DIRECT CURRENT components, real components and imaginary components, and said microcontroller generates said gating signals in response to said index values.

22. The electric arc furnace of claim 19, wherein said alternating current signals include line-to-virtual ground voltages at each of said three electrodes, line currents flowing through each of said primary windings, line-to-line voltages across said three primary windings and line-to-virtual ground voltages at each o said secondary windings.

23. The electric arc furnace of claim 22, wherein said predictive line controller further monitors one of said primary line-to-line voltages for synchronization of said controller.

* * * * *